US011810560B1

(12) United States Patent
Vanderschaegen et al.

(10) Patent No.: US 11,810,560 B1
(45) Date of Patent: *Nov. 7, 2023

(54) VOICE-CONTROLLED DEVICE SWITCHING BETWEEN MODES BASED ON SPEECH INPUT

(71) Applicant: Amazon Technologies, Inc., Seattle, WA (US)

(72) Inventors: Valere Joseph Vanderschaegen, Kalama, WA (US); Kazim Das, San Jose, CA (US); Donald L. Cantrell, Oakland, CA (US); Johan Le Nerriec, Milpitas, CA (US); Joseph Pedro Tavares, Kenmore, WA (US)

(73) Assignee: Amazon Technologies, Inc., Seattle, WA (US)

(*) Notice: Subject to any disclaimer, the term of this patent is extended or adjusted under 35 U.S.C. 154(b) by 249 days.

This patent is subject to a terminal disclaimer.

(21) Appl. No.: 17/222,282

(22) Filed: Apr. 5, 2021

Related U.S. Application Data

(63) Continuation of application No. 16/143,840, filed on Sep. 27, 2018, now Pat. No. 10,978,062.

(51) Int. Cl.

| | |
|---|---|
| ***H04N 21/422*** | (2011.01) |
| ***H04N 21/472*** | (2011.01) |
| ***G10L 15/22*** | (2006.01) |

(52) U.S. Cl.

CPC ....... *G10L 15/22* (2013.01); *H04N 21/42203* (2013.01); *H04N 21/47202* (2013.01); *H04N 21/47217* (2013.01); *G10L 2015/223* (2013.01)

(58) Field of Classification Search

None

See application file for complete search history.

(56) References Cited

U.S. PATENT DOCUMENTS

| | | | | |
|---|---|---|---|---|
| 10,560,737 | B2 | 2/2020 | Lawrence et al. | |
| 10,847,176 | B2 | 11/2020 | Kristjansson et al. | |
| 10,978,062 | B1 * | 4/2021 | Vanderschaegen | H04N 21/47217 |
| 2004/0046677 | A1 * | 3/2004 | Dresti | G08C 17/00 348/E5.127 |

(Continued)

OTHER PUBLICATIONS

U.S. Appl. No. 16/143,840, Notice of Allowance, dated Dec. 11, 2020, 20 pages.

*Primary Examiner* — Junior O Mendoza

(74) *Attorney, Agent, or Firm* — Kilpatrick Townsend & Stockton LLP

(57) ABSTRACT

Techniques for presenting content by a voice-controlled device are described. In an example, the voice-controlled device is operatively coupled to a presentation device and supports dual mode functionalities. In a first mode, the voice-controlled device sends content for presentation at the presentation device. In a second mode, the voice-controlled device presents the content at a presentation interface of the voice-controlled device. Based on speech input from a user indicating an issue with a content presentation in the first mode, the voice-controlled device switches to the second mode and presents a message at the presentation interface indicating that subsequent content presentations would be presented at this interface. The voice-controlled device remains in the second mode until receiving additional speech input necessitating a switch to the first mode.

20 Claims, 14 Drawing Sheets

(56) References Cited

U.S. PATENT DOCUMENTS

| | | | | |
|---|---|---|---|---|
| 2015/0373393 | A1 | 12/2015 | Lee et al. | |
| 2017/0083285 | A1 | 3/2017 | Meyers et al. | |
| 2018/0211665 | A1 | 7/2018 | Park et al. | |
| 2018/0330069 | A1 | 11/2018 | Quinn et al. | |
| 2019/0311718 | A1 | 10/2019 | Huber et al. | |
| 2020/0057607 | A1 * | 2/2020 | Jeong | G06F 3/167 |

* cited by examiner

| Case 510 | Speech Input 520 | VCMD Mode 530 | Power State 540 | Activity State 550 | Outcome 560 |
|---|---|---|---|---|---|
| 1 | Non TV-AVR request | Audio Mode | On | Active | Play audio response on VCMD internal speakers |
| 2 | Non TV-AVR request | Audio Mode | On | Inactive | Play audio response on VCMD internal speakers |
| 3 | Non TV-AVR request | Audio Mode | On/Unknown | Active | Play audio response on VCMD internal speakers |
| 4 | Non TV-AVR request | Audio Mode | On/Unknown | Inactive | Play audio response on VCMD internal speakers |
| *5* | *Non TV-AVR request* | *AV Mode* | *On* | *Active* | *Pause stream to TV-AVR; Send audio response to TV-AVR; Resume stream* |
| 6 | Non TV-AVR request | AV Mode | On | Inactive | Play audio response on VCMD internal speakers |
| **7** | **Non TV-AVR request** | **AV Mode** | **On/Unknown** | **Active** | **Send audio response to TV-AVR** |
| 8 | Non TV-AVR request | AV Mode | On/Unknown | Inactive | Play audio response on VCMD internal speakers |
| 9 | TV-AVR request | Audio Mode | On | Active | Switch to TV mode; Send AV response to TV-AVR |
| 10 | TV-AVR request | Audio Mode | On | Inactive | Play TTS; switch to TV mode; Send AV response to TV-AVR |
| 11 | TV-AVR request | Audio Mode | On/Unknown | Active | Play TTS; Switch to TV mode; Send AV response to TV-AVR |
| 12 | TV-AVR request | Audio Mode | On/Unknown | Inactive | Play TTS; Switch to TV mode; Send AV response to TV-AVR |
| 13 | TV-AVR request | AV Mode | On | Active | Pause stream to TV-AVR; Send AV response to TV-AVR; Resume stream |
| 14 | TV-AVR request | AV Mode | On | Inactive | Switch to VCMD input; Send AV response to TV-AVR |
| **15** | **TV-AVR request** | **AV Mode** | On/Unknown | **Active** | **Send AV response to TV-AVR** |
| 16 | TV-AVR request | AV Mode | On/Unknown | Inactive | Control TV-AVR; Send AV response to TV-AVR |

FIG. 5

VOICE-CONTROLLED DEVICE SWITCHING BETWEEN MODES BASED ON SPEECH INPUT

CROSS-REFERENCE TO RELATED APPLICATIONS

This application claims priority to and is a continuation of U.S. application Ser. No. 16/143,840, filed on Sep. 27, 2018, issued to U.S. Pat. No. 10,978,062 on Apr. 13, 2021, and titled "VOICE-CONTROLLED DEVICE SWITCHING BETWEEN MODES BASED ON SPEECH INPUT," the content of which is herein incorporated in its entirety for all purposes.

BACKGROUND

As voice recognition technology improves, systems that employ such technology continue to proliferate. Some systems employ what is referred to as near-field voice recognition where a user speaks into a microphone located on a hand held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be used to request content to be played on an audio and/or video system. However, due to the increasing topological complexity of many home audio-video systems, there remains a need for voice-controlled devices that can reliably play content on multiple systems in accordance with a user's voice commands.

BRIEF DESCRIPTION OF THE DRAWINGS

Various embodiments in accordance with the present disclosure will be described with reference to the drawings, in which:

FIG. 5 shows outcomes for using a voice-controlled multimedia device based on a mode of the voice-controlled device, a power state and an activity state of a presentation device, and speech input in accordance with one or more embodiments of the disclosure;

DETAILED DESCRIPTION

Figure 1:
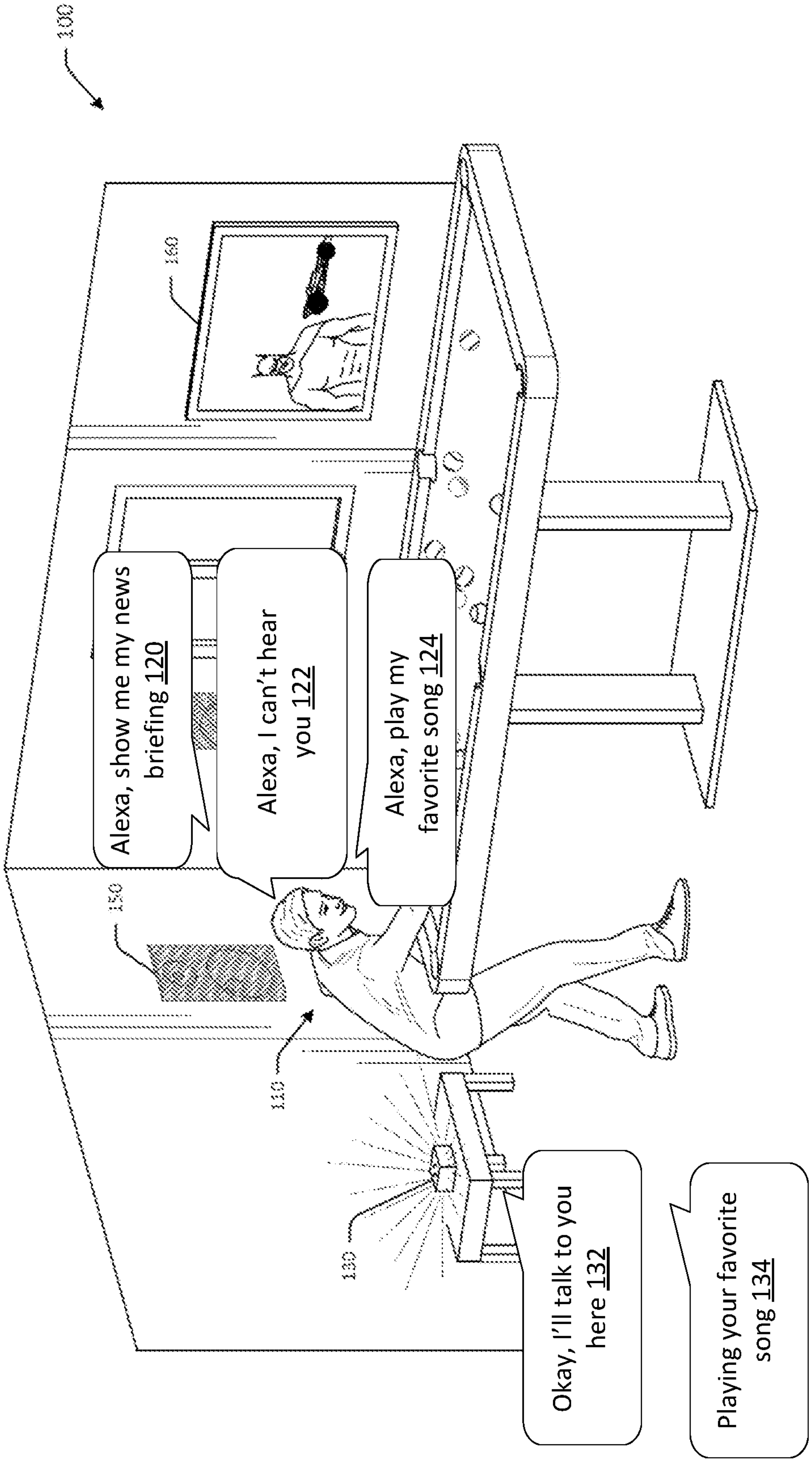
FIG. 1 shows an example use case and schematic drawing of a voice-controlled multimedia device in accordance with one or more embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of this disclosure relate to, among other things, systems, methods, computer-readable media, techniques, and methodologies for devices that can be voice-controlled and respond to audible instructions. In an example, voice-controlled multimedia devices (VCMD), also referred to herein as a voice-controlled device, can be operatively connected to a presentation device external to the VCMD and can operated in multiple modes. The presentation device can be a television having a speaker and a display, an audio-video receiver having a speaker, or any other device that includes a user interface available to present data to a user. In a first mode, the VCMD device sends data to the presentation device for presentation to the user at the presentation device. In a second mode, the VCMD device does not send data to the presentation device. Instead, the data is presented at an internal presentation interface. For instance, the VCMD plays audio on its internal speaker (e.g., a built-in speaker of the VCMD). Based on a speech input from the user, the VCMD determines that a response should be presented at the presentation device. Accordingly, the VCMD sends the response to the presentation device while being in the first mode. Subsequently, the VCMD receives speech input from the user indicating an issue with the presentation of the response (e.g., indicating that an audio response was not heard). The VCMD switches from the first mode to the second mode and presents a message at the internal presentation interface indicating that subsequent responses will be presented at the internal presentation interface. The VCMD remains in the second mode and uses the internal presentation interface for the subsequent responses until a subsequent speech input is received from the user indicating the need for presentation at the presentation device. At that point, the VCMD presents a message at its internal presentation interface indicating that the presentation is shifting to the presentation device, switches from the second mode to the first mode, and sends the relevant response to the subsequent speech to the presentation device for presentation thereat.

To illustrate, consider a VCMD device that is operatively connected to a television over a high-definition multimedia interface (HDMI) port and that responds to a particular wakeword, such as "Alexa." A user requests "Alexa, play the movie 'XYZ'." In response and while being in the first mode (referred to herein as "audio and video (AV) mode" for ease of reference), the VCMD flashes lights and sends audio and video (AV) data to the television over the HDMI port. In certain situations, and as further described herein below, the HDMI port may not be an active input port of the television. Accordingly, the AV data is not streamed on the television and the user may not perceive that the VCMD is streaming the AV data. The user then asserts "Alexa, I can't hear you." The VCMD device determines that this user utterance indicates that an issue exists with the AV data stream. In response, the VCMD switches to the second mode (referred to herein as "audio mode" for ease of reference), resets its volume level to a default level, flashes its lights, and plays an audio message on its internal speaker "Okay, I'll talk to you here now." From that point on, the VCMD device responds to speech input requesting an audio response by playing the audio response on its internal speaker, while being in the audio mode. If input speech requests an AV response, the VCMD plays a message on its internal speaker to indicate that the AV response will be presented at the television (e.g., "Okay, your movie is about to start on the television"), switches to the AV mode, sends a control signal to the television to switch its active input port to the HDMI port, and sends the AV response to the television through the HDMI port of the television.

Embodiments of the present disclosure provide many technical advantages over existing VCMDs. For example, the embodiments described herein allow a VCMD to reliably play content on its internal speakers in one mode and on a presentation device external to the VCMD in another mode, in accordance with a user's voice commands. Even when the presentation device may not properly signal to the VCMD that the data path for sending data from the VCMD to the presentation device is available, the VCMD switches to the proper mode to respond to the user's voice commands.

In the interest of clarity of explanation, embodiments of the present disclosure are described in connection with AV requests (e.g., requests for audio and video content) and non-AV requests (e.g., requests for audio only content) to a VCMD operatively coupled to a TV-AVR system (e.g., a system that includes a television, an audio-video receiver, and external speakers). However, the embodiments are not limited as such and similarly apply to other types of requests and to presentation systems that include, for instance, a VCMD with an internal presentation interface (e.g., internal speakers, displays, array of light emitting diodes (LEDs), etc.) and one or more different types of presentation devices. Generally, a VCMD is operatively coupled to a presentation device. In response to speech input from a user, the VCMD can play a response over its internal presentation interface or send it to the presentation device for presentation thereat depending on a number of factors. These factors include the content of the speech input, the mode of the VCMD, and one or more states of the presentation device. Upon a specific speech input from the user indicating that the response was not perceived by the user, the VCMD can switch, as applicable, to using its internal presentation interface for the presentation of responses to the user.

FIG. 1 shows an example use case and schematic drawing of a VCMD 130 in accordance with one or more embodiments of the disclosure. A user 110 may be in an ambient environment with a number of electronic devices, such as an audio system 150, a television 160, wirelessly controlled lighting (not shown), and other electronic devices configured to be controlled remotely. A VCMD 130 may be in the ambient environment of the user 110, such as on a table, in a cabinet, or elsewhere in the ambient environment.

As illustrated, the VCMD 130 is operatively connected to the TV-AVR system that includes the television 160 and the audio system 150. For example, the VCMD 130 includes a data interface, such as a wired AV interface port (e.g., a VGA port, DVI port, and/or a HDMI port configured to output video content, e.g., standard resolution content, high-definition content, ultra-high-definition digital content (e.g., 4K resolution, UHD resolution, etc.), or a wireless interface port. The VCMD 130 may be connected to the television 160 via the data interface (e.g., via the AV port or wirelessly) and may cause streaming of the requested content with visual presentation of the content at the television 160. The television 160 may be similarly connected to the audio system 150 and audio may be played on the speakers of this audio system 150.

Further, the VCMD 130 may support multiple modes. For example, in an audio mode, the VCMD 130 plays audio on its internal speakers and does not stream the audio to the audio system 150 via the data interfaces. In an AV mode, the VCMD 130 streams audio to the audio system 150 and/or to the speakers of the television 160 and does not play the audio on its internal speakers. Similarly, the VCMD 130 streams AV content to the presentation system, such that video content is presented on the television 160 (e.g., on its display) and audio is played by the audio system 150 and/or the speakers of the television 160. The capability of the VCMD 130 to route user-requested content to either its internal speakers or to the presentation system is referred to herein as "dual-mode functionality" as further described in connection with FIG. 3.

The user 110 may verbally interact with the VCMD 130 to request content from the VCMD, which itself can be connected to one or more digital content sources, e.g., to one or more audio content sources and/or video content sources via a wide area or local area computer network. For example, the user 110 may utter a phrase 120 (also referred to herein as a user utterance or speech input) that includes an instruction, command, or request, such as "Alexa, show me my news briefing."

The VCMD 130 may detect the speech input from the user 110, may flash LED lights at a particular wavelength (e.g., blue lights are flashed) indicating that the speech input is detected and being processed, and may determine a meaning of the phrase 120. For example, the VCMD 130 may detect a trigger word or a wakeword of "Alexa," or another trigger word, and may subsequently begin monitoring for voice commands using one or more microphones. In some embodiments, detection and/or processing of the speech input may be done locally at the VCMD 130, while in other embodiments the VCMD 130 may communicate with one or more remote server computers to determine whether the speech input includes one or more voice commands. In some embodiments, the trigger word may be detected and determined locally, while the full speech input including potential voice commands may be processed remotely. In other embodiments, the full speech input can be processed entirely locally or using any combination of local and/or remote speech processing services as described in further detail below in reference to FIG. 3.

After determining or receiving the meaning of the phrase 120 in the example of FIG. 1, the VCMD 130 may initiate one or more response actions. In this example, the VCMD 130 may determine that the user 110 would like to watch, as opposed to merely listen to, their news briefing because the phrase 120 contains the words "show me" and "my news briefing." In response to this determination, the VCMD 130 may then determine that the user-requested content (their news briefing) should be routed to the presentation system in the AV mode of the VCMD 130, rather than being played as audio on its internal speakers. The VCMD 130 may then determine the state of the external presentation system to determine whether or not any external devices include an open video channel, e.g., whether or not the television 160 is in an ON state and set to an input that allows streaming AV content to be displayed from the VCMD 130. In some instances, if the VCMD 130 detects that the television 160 is in an OFF state, the VCMD 130 can initiate a control sequence that can first turn on the television 160 and then set the television AV input to the input associated with the VCMD 130. Next the VCMD 130 can stream the AV content (e.g., a video of the news briefing, along with an audio of a reading of the news briefing) to the television 160, e.g., via an HDMI port, or the like.

Figure 12:
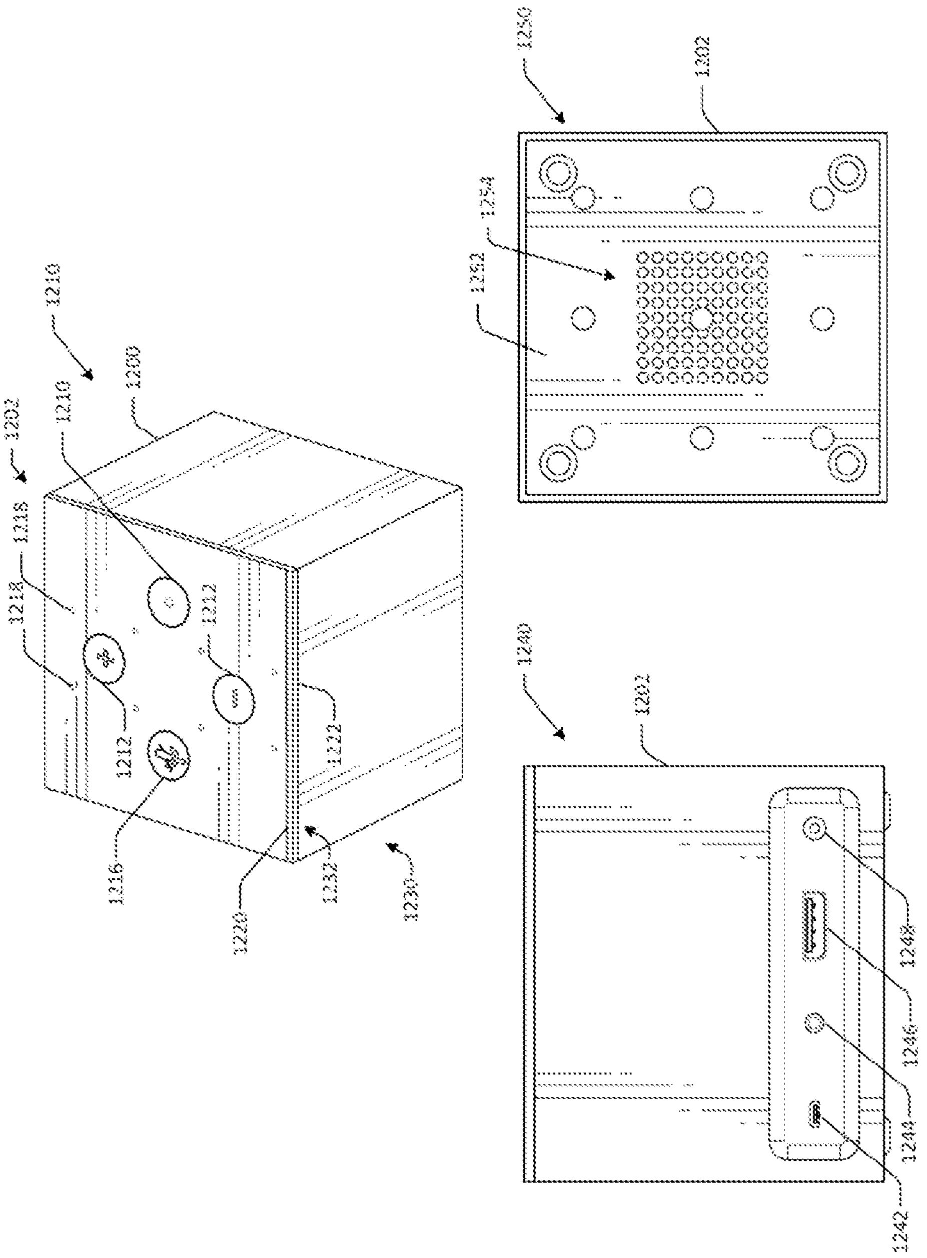
FIG. 12 schematically depicts a voice-controlled multimedia device in various views in accordance with one or more embodiments of the present disclosure.
Figure 13:
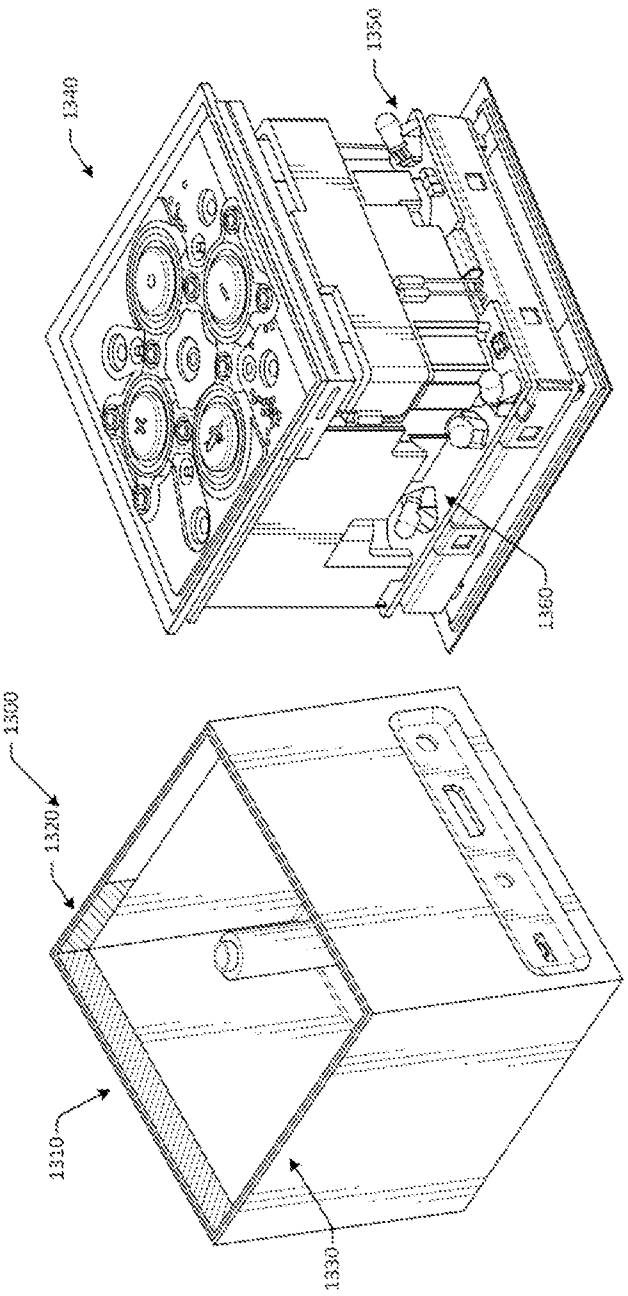
FIG. 13 shows another view of a voice-controlled multimedia device in accordance with one or more embodiments of the disclosure.
Figure 14:
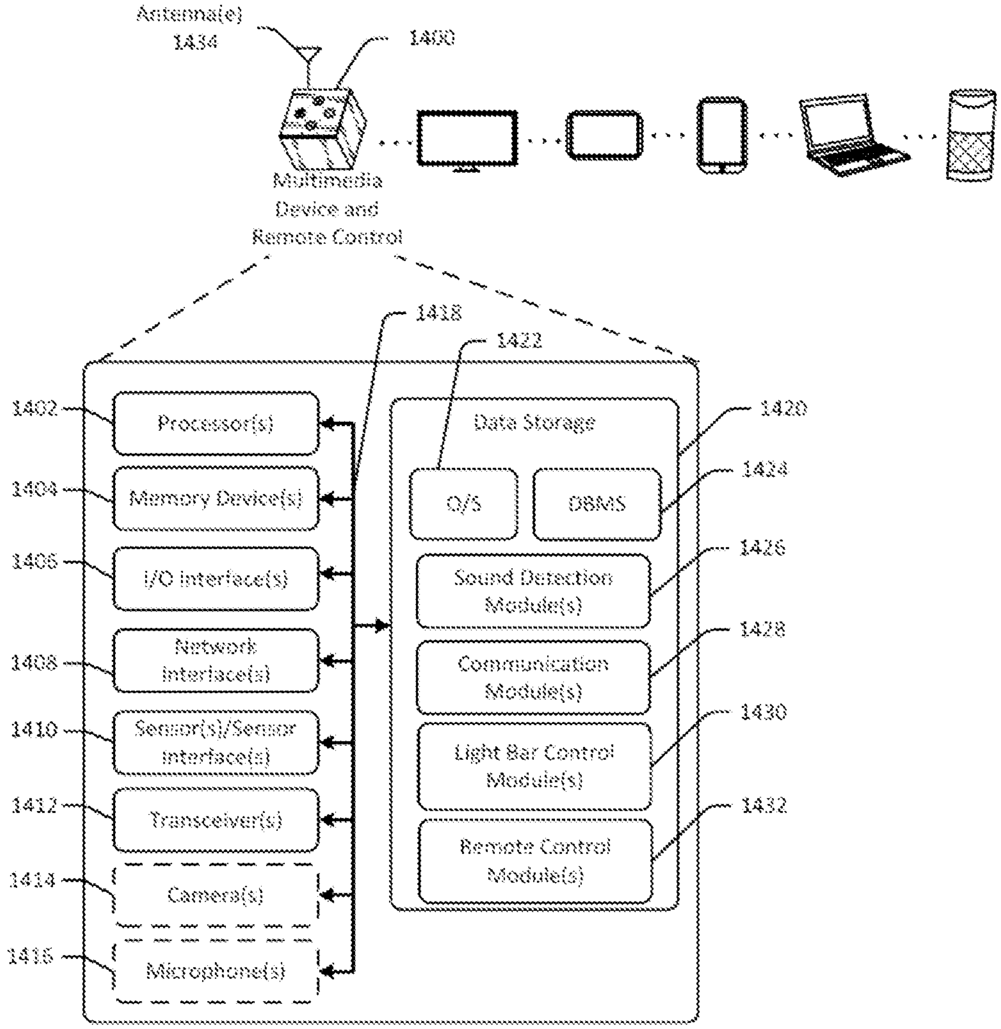
FIG. 14 is a schematic block diagram of one or more illustrative voice-controlled multimedia devices in accordance with one or more embodiments of the disclosure.

To implement the response actions, the VCMD 130 can send one or more commands or instructions via a wired data interface, e.g., HDMI or the like, or may use a wireless data interface, e.g., an infrared optical channel, similar to one used by a universal remote control device. Accordingly, the VCMD 130 may include a housing with a number of sidewalls, one or more AV output port(s) accessible through one or more of the sidewalls, and a set of one or more IR LEDs that are configured to emit infrared light through one or more of the sidewalls. For example, FIGS. 12-14 show one example of a VCMD that includes IR LEDs. In some embodiments, the infrared light can be emitted over three hundred sixty degrees about the VCMD 130 so as to provide infrared coverage of a relatively large portion of the ambient environment. In some embodiments, the VCMD 130 may include infrared LEDs oriented or positioned in opposite directions, so as to increase infrared LED coverage of the ambient environment.

In various situations, an issue may occur with the presentation of the user-requested content by the VCMD 130 at the presentation system. In an example, the issue relates to the user 110 not perceiving the AV content (e.g., not being able to watch the news briefing). In particular, the VCMD 130 may send the AV content to the presentation system. However, the presentation system may actually be in an OFF state or its active data interface may be set to another device. For example, the television 160 may be powered off or its active AV input may be set to a HDMI port connected to a set top box instead of the VCMD 130. Further, the VCMD 130 may not recognize that no data path to the presentation system (e.g., no HDMI path) is available because of the implementation of the data interface by the presentation system, as further described in connection with FIG. 5. For instance, after being powered off, the television 160 may still indicate that a hot plug detect (HPD) connection and a high-bandwidth digital content protection (HDCP) connection over the HDMI port are still active (e.g., based on HPD and HDCP signals) for a period of time (e.g., for ten to thirty minutes). Accordingly, the VCMD 130 may determine that the HDMI path to the television 160 may still exist within this time period, when it is not. In this case, the VCMD 130 sends the user-requested content over the HDMI port, but this content is ultimately not presented to the user 110, thereby resulting in the user 110 not perceiving the streamed AV content. In a way, the user 110 perceives a presentation issue with the VCMD 130 by not functioning properly or not being fully responsive (e.g., the VCMD's 130 output not being visible or audible), despite the user's 110 clear command and the VCMD's 130 lights flashing, indicating that the command was detected by the VCMD 130.

To address such situations in which the VCMD 130 detects speech input and sends a response to the presentation system and where the user 110 may not perceive the response, the VCMD 130 may support a specific speech input 122. In an example, the specific speech input 122 may include, in addition to a wakeword, a predefined phrase or a correction phrase that can be uttered by the user 110 to indicate the issue and is received by the VCMD 130, where the predefined phrase or correction phrase can invoke a predefined corrective action. Subsequently, the VCMD 130 can switch between modes, reset volume levels, and communicate over its internal speakers.

For instance, the wakeword is "Alexa" and the predefined phrase or the correction phrase is "I can't hear you." Upon receiving at its microphone a user utterance "Alexa, I can't hear you," the VCMD 130 detects the wakeword "Alexa," analyzes (locally or remotely by relying on server computers) the remainder of the utterance "I can't hear you," determines that it should perform a corrective action, and performs this action. The analysis can include phrase matching and/or intent matching. The phrase matching may involve determining a match between the remainder of the utterance and the predefined phrase (e.g., the user 110 uttered a predefined voice command to trigger the corrective action). The intent matching may involve determining an intent of the correction phrase by using query understanding and natural language processing, and determining that this intent is associated with the corrective action (e.g., the user 110 intends to indicate that the response was not heard). In other words, the predefined phrase may represent a voice command that is predefined and known to the user 110 and that should be uttered by the user 110 to trigger a corrective action. In comparison, the correction phrase could be a phrase uttered by the user 110, indicating the presentation issue, and indicating a user intent to correct the presentation issue (e.g., "I didn't hear you," "why didn't you respond," "your volume is too low," etc.).

In an example, the predefined phrase can be set by a service provider of the VCMD 130. In this case, the predefined phrase is common to a plurality of VCMDs (e.g., to all the VCMDs provided by the service provider). Additionally or alternatively, the predefined phrase can be set by the user 110 as a user setting. For instance, the user 110 may use a user interface associated with the VCMD 130 to define different settings, including the predefined phrase. These settings are then stored in a profile associated with the VCMD 130. Similarly, the corrective action can be predefined by the service provider or defined by the user 110 via the user interface and the profile may associate the predefined phrase with the corrective action. In addition, multiple predefined phrases may be stored in the profile and associated with the same or different corrective actions. Upon matching the user utterance to any of the predefined phrases, the VMCD 130 may perform the associated corrective action(s).

In an illustrative example, the predefined phrase is set to "I can't hear you," and the corrective action is set to switching the VCMD 130 to the audio mode (as necessary if not already in the audio mode), adjusting the volume level of its internal speakers to a default level, flashing LED lights in a particular color and/or pattern, and/or playing a text-to-speech (TTS) response on its internal speakers at the default volume level indicating that subsequent responses will be played on the internal speakers.

In an example, the default level corresponds to a volume level that is loud enough for the user 110 to hear. For instance, the VCMD 130 may support a range of volumes between "one" and "ten," where "one" is the smallest unmute volume and "ten" is the loudest volume. In this case, the default volume could be set to "seven." Alternatively, the default volume can vary within a range (e.g., between "six" and "eight"). When the range is used, the first time the VCMD 130 receives the specific speech input 122, the default volume may be set to the smallest value in the range (e.g., "six") and may be incrementally increased upon subsequently receiving the specific speech input 122 again (e.g., the default volume is increased to "seven" the second time the specific speech input 122 is received).

As illustrated in FIG. 1, upon receiving and processing the specific speech input 122 "Alexa, I can't hear you," the VCMD 130 switches to the audio mode (e.g., it no longer sends content to the presentation system and instead plays audio content on its internal speakers), adjusts its volume level (e.g., to a default volume level), flashes its lights, and plays the TTS response 132 "Okay, I'll talk to you here."

Thereafter, the VCMD 130 is in the audio mode and can respond to the user 110 depending on their subsequent speech inputs. For example, if the user 110 requests AV content, the VCMD 130 may switch to the AV mode (e.g., sends control signals to power on the television 160 and/or activate its HDMI port connected to the VCMD 130, stops routing responses to its internal speakers, and starts routing these responses to the television 160), and may send the AV response to the presentation system for presentation to the user 110. If the user 110 requests audio content, the VCMD 130 may stay in the audio mode and present the audio response over its internal speakers.

As illustrated in FIG. 1, upon receiving speech input 124 "Alexa, play my favorite song," the VCMD 130 detects the wakeword, flashes its LED lights, determines that audio is requested, retrieves the requested audio (e.g., the user's 110 favorite song from a playlist stored at a server computer), and plays the audio over its internal speakers (shown in FIG. 1 as audio response 124 "Playing your favorite song").

Hence, the VCMD 130 supports reliable interactions with the user 110. Its dual-mode functionality enables the user 110 to receive content via the internal speakers of the VCMD 130 and an external presentation system. In addition, if the user 110 perceives a presentation issue with the VCMD 130, the specific speech input 122 enables the VCMD 130 to quickly switch to the proper mode and reset the volume level of its internal speakers.

Figure 2:
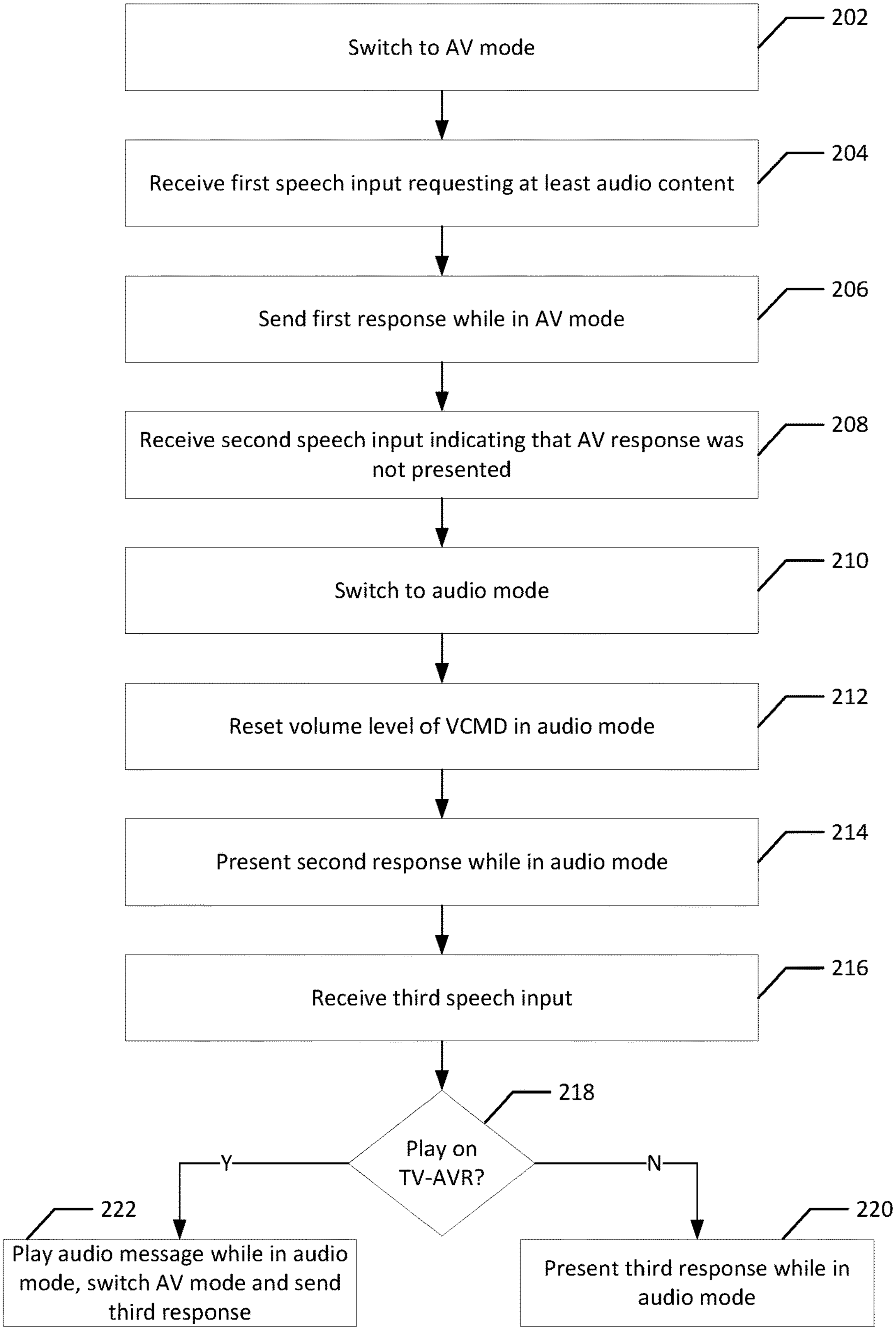
FIG. 2 shows an example flow for switching between modes of a voice-controlled multimedia device in accordance with one or more embodiments of the disclosure.

FIG. 2 shows an example flow for switching between modes of a VCMD in accordance with one or more embodiments of the disclosure. Some or all of instructions for performing the steps of the illustrative flow can be implemented as hardware circuitry and/or stored as computer-readable instructions on a non-transitory computer-readable medium of the VCMD. As implemented, the instructions represent modules that include circuitry or code executable by a processor(s) of the VCMD. The use of such instructions configures the VCMD to perform the specific operations described herein. Each circuitry or code in combination with the processor represents a means for performing a respective step(s). While the steps are illustrated in a particular order, it should be understood that no particular order is necessary and that one or more steps may be omitted, skipped, and/or reordered. Further, although the flow is described in connection with the VCMD, some of the steps may be performed by a remote computer sever operatively connected to the VCMD, or may be distributed between the VCMD and such a server.

As illustrated, the flow starts at step 202, where the VCMD switches from an audio mode to an AV mode, as applicable (e.g., if not already in the AV mode). In an example, the VCMD includes a data interface (e.g., an HDMI port) that is connected to a data interface of a TV-AVR (e.g., one of the HDMI ports on the television). As needed, the VCMD sends control signals to power on the TV-AVR and/or activate the data interface of the TV-AVR such that the VCMD and the TV-AVR become operatively connected, and stops routing responses to the VCMD's internal speakers. Further operations for controlling the TV-AVR and sending content thereto are further described in connection with FIGS. 8-11.

In step 204, the VCMD receives first speech input from a user indicating a request for AV content. In an example, the first speech input is received at a microphone of the VCMD while the VCMD is in the AV mode. The first speech input includes a wakeword (e.g., "Alexa") and a user utterance requesting, for instance, AV content (e.g., "play movie 'XYZ'"). The VCMD detects the wakeword, processes the user utterance, determines that a particular AV content is requested, and retrieves the AV content from a content source (e.g., a remote content server). The VCMD also detects, given the user utterance, that a first response (e.g., an AV response that includes AV content) should be presented at the TV-AR.

In step 206, the VCMD sends the first response to the TV-AVR while being in the AV mode. In an example, the VCMD sends the AV content to the TV-AVR over the operatively connected data interfaces (e.g., the HDMI ports). This sending can include streaming the AV content.

In step 208, the VCMD receives second speech input indicating an issue with a presentation of the first response. In an example, the second speech input is received at the microphone of the VCMD and includes the wakeword (e.g., "Alexa") and indicates an issue with the presentation of the first audio response (e.g., that the first was not heard by the user, by including the user utterance of "I can't hear you"). The VCMD processes the second speech input and associates the user utterance from the second speech with the presentation issue of the first response. This association is used to trigger a corrective action that mitigates the presentation issue. For instance, the VCMD determines a match with a predefined phrase (e.g., also "I can't hear you" stored in a profile associated with the VCMD) or an intent of the user (e.g., "I didn't hear you," "why didn't you respond" or "your volume is too low"). This phrase or the intent indicates presentation issue and is associated with the corrective action (e.g., also defined in the profile). The corrective action includes, for instance, switching the VCMD to the audio mode, changing a setting of an internal presentation interface of the VCMD (e.g., changing or resetting the volume level of its internal speakers to a specified level or a default level), among other defined actions.

In step 210, the VCMD switches to the audio mode from the AV mode, as indicated by the corrective action. In an example, the VCMD stops routing responses to the TV-AVR over the data interfaces. Instead, the VCMD changes its routing setting to send the responses to its internal speakers.

In step 212, the VCMD resets the volume level of its internal speakers, as indicated by the corrective action. For example, the volume level is increased or decreased to match the specified or default level. In this way, the VCMD's subsequent audible responses would be heard by the user, thereby mitigating the presentation issue.

In step 214, the VCMD presents a second response to the second speech input at its internal presentation interface while being in the audio mode. In an example, the VCMD plays an audio response (e.g., a TTS message) over its internal speakers based on the volume level. The second audio response indicates that a subsequent audio response will be played over the internal speaker (e.g., the TTS message includes "Okay, I'll talk to you here").

In step 216, the VCMD receives third speech input from the user. In an example, the third speech input is received at the microphone.

In step 218, the VCMD determines whether a third response to the third speech input should be presented at its internal presentation interface or sent to the TV-AVR. In an example, this determination is made based on the user utterance in the third speech. If the user utterance indicates the intent of the user is to receive audio only, the VCMD determines that an audio response should be presented at its internal speakers and follows operation 220. For instance, this can be the case whether the third speech input includes "Alexa, play my favorite song." If the user utterance indicates the intent to receive AV content (or video only content), the VCMD determines that an AV response (or a video response) should be presented at the TV-AVR and follows operation 222. For instance, this can be the case whether the third speech input includes "Alexa, play movie 'ABC'."

In step 220, the VCMD presents the third response (e.g., an audio only response) on its internal speakers while staying in the audio mode. In an example, the VCMD retrieves the requested audio and plays the audio response over its internal speakers.

In step 222, the VCMD plays an audio message while being in the audio mode, switches to the AV mode, and sends a third response while being in the AV mode (e.g., an AV response or a video response as applicable) to the TV-AVR over the data interfaces. In an example, the VCMD plays a TTS message over its internal speakers indicating that the video response will be played at the display of the television (e.g., "Okay, your movie is about to start"). As applicable, the VCMD sends control signals to power on the TV-AVR and activate the data interface (e.g., HDMI port) connected to the VCMD, retrieves the relevant content from a content server, and streams this content to the TV-AVR.

Figure 3:
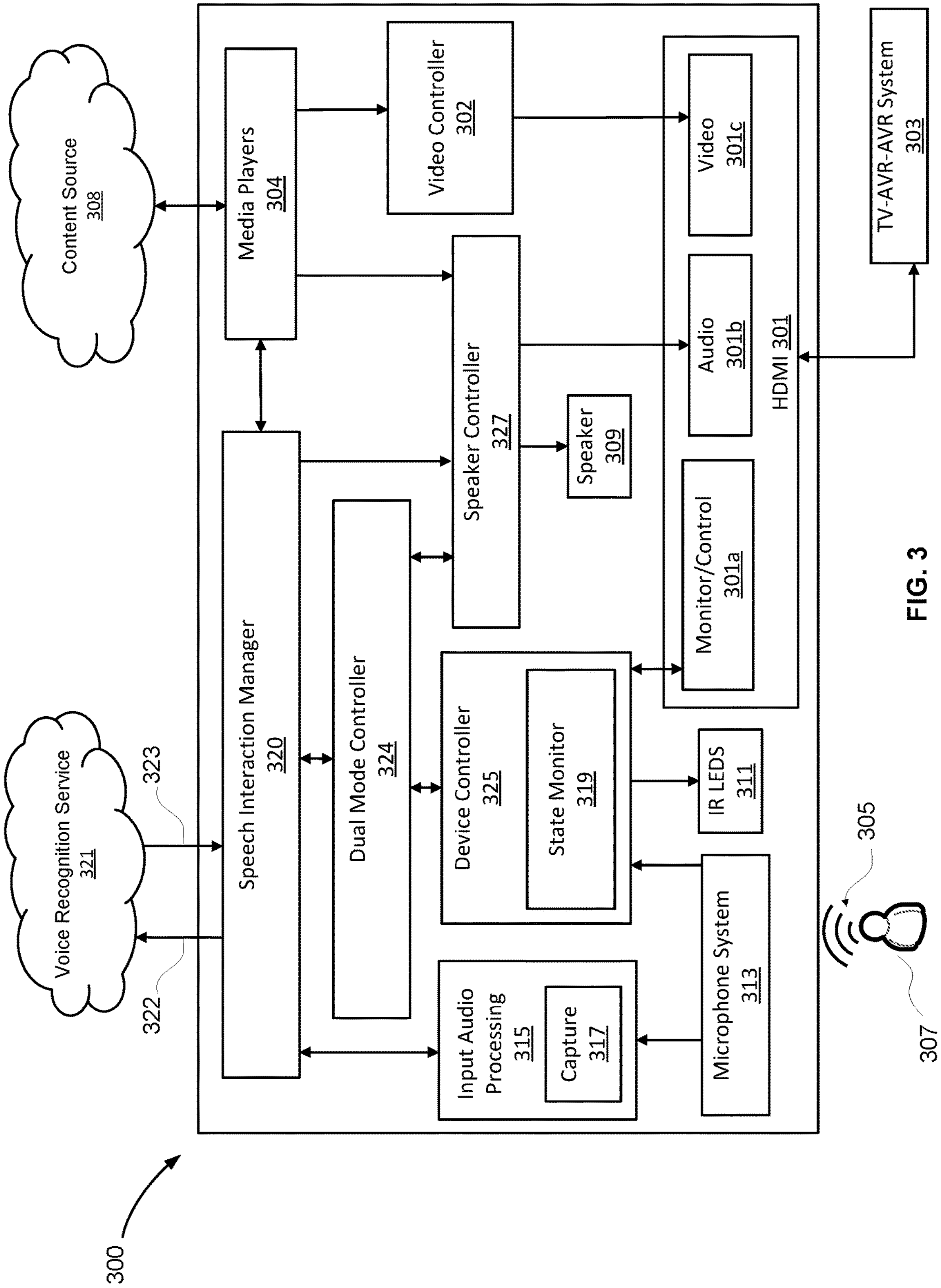
FIG. 3 shows a block diagram of a voice-controlled multimedia device in accordance with one or more embodiments of the disclosure.

FIG. 3 shows a block diagram of a VCMD 300 in accordance with one or more embodiments of the disclosure. The internal architecture of the VCMD 300 is configured to provide a multi-step user input and content delivery process that begins with the reception of speech input such as a user utterance or command and ends with content being delivered to one or more output systems of the VCMD 300 and/or a TV-AVR system 303. As introduced above, the VCMD 300 can be connected directly to a television system (TV) or can be connected indirectly to a TV by way of an audio-video receiver system (AVR), with the AVR having one or more external speakers.

To provide a connection to the TV-AVR system 303, the VCMD 300 can include one or more AV ports, e.g., HDMI port 301. The HDMI port 301 can receive one or more electrical interconnects, such as an HDMI cable. For simplicity, the interconnects and associated circuitry for the HDMI port 301 are grouped into three logical sub-blocks including video block 301*c*, audio block 301*b*, and monitor/control block 301*a*. The video block 301*c* of HDMI port 301 can receive video data and transmit the video data to the TV-AVR system 303. Likewise, the audio block 301*b* can receive audio data and transmit the audio data to the TV-AVR system 303. Monitor/Control block 301*a* can monitor one or more data lines of the HDMI port to determine the state of the TV-AVR System 303. Monitor/Control block 301*a* can also be used to provide HDMI data, e.g., in the form of Consumer Electronics Control (CEC) commands, to the TV-AVR system 303 to control the state of the TV-AVR system 303. Various CEC commands are available such as ON/OFF, volume control, mute/unmute, AV input selection, etc.

In addition, to control the state of the TV-AVR system 303 in the case where components of the system may not be CEC compatible, the VCMD 300 can be equipped with one or more IR transmitters, e.g., IR LEDS 311. To control one or more components of the TV-AVR system 303, the IR transmitters can output data in the form of IR codes/signals that are then received by one or more IR receiver(s) that are operably connected to the TV-AVR system (not shown). Various control functions are possible such as ON/OFF, volume control, mute/unmute, AV input selection, etc.

The VCMD 300 includes a microphone system 313 that is configured to monitor the ambient sounds within an area around VCMD 300, e.g., within a room of a house, and to detect whether the ambient sounds include a speech input, e.g., a user utterance 305 from a user 307. In response to the user utterance 305, the VCMD 300 can play content on an output system that is either internal to the VCMD 300, e.g., internal speaker 309, or can play content on an external system, e.g., the TV-AVR system 303. The content associated with an utterance can be purely visual, purely audio, or can be multimedia, such as audiovisual content. The content can be sourced from one or more remote server computers and played by one or more media player(s) 304. The content sources can be located, for instance, at a remote voice recognition service 321 and/or at a remote content source 308 either of which can be accessible via the user's local area network or via the Internet.

The VCMD 300 is configured to route the user-requested content to either the internal speaker 309 of the VCMD 300 or to the TV-AVR system 303 depending both on the details of the user utterance 305 and on the current state of the TV-AVR system 303, e.g., whether or not the TV-AVR system 303 is currently powered ON or OFF. The ability of the VCMD 300 to route user-requested content to either the speaker 309 or the TV-AVR system 303 is referred to herein as "dual-mode functionality" because it allows the VCMD 300 to operate in two modes that otherwise would require two separate devices to facilitate. In an audio mode, the VCMD 300 can operate like an audio playback voice-controlled device that includes audio-only output. In an AV mode, the VCMD 300 can operate as a streaming digital media player that is operably coupled to one or more displays (e.g., a TV) and can be operated by a voice-controlled remote.

In an example, an ON power state and an OFF power state refer to the power state of one or more components of the TV-AVR system. For instance, the ON power state refers to a state where all the necessary components for viewing content on the screen of the TV are provided with power. Likewise, the OFF state is the power state of a TV that results when a user toggles a power switch when the TV is initially in the ON state. As such, the term "OFF state" can include both unpowered states and/or so-called standby states where the display of the TV may be powered off, but some limited number of other components within the TV may still be receiving power. For instance, in a standby state, a subset of TV components may be listening for CEC control commands and the TV can be switched from the OFF state to the ON state when HDMI data associated with a "Turn TV ON" CEC command is received.

In an addition, an "ON/Unknown" state refers to a state of not knowing with a certainty if one or more components of the TV-AVR system are powered on. For instance, after being in the ON state, the TV-AVR system may be powered off through a remote control of the TV-AVR or some other means other than a voice command to or a remote control of the VCMD. However, the VCMD may not determine that the TV-AVR is now in the OFF state. Different reasons may exist for the ON/Unknown state. One reason relates to how the TV-AVR implements the data interface specifications. For example, and within the context of using HDMI, upon powering off, the TV-AVR should update HPD and HDCP connections to inactive by, in part, changing the HPD and HDCP signals from a high voltage value(s) to a low voltage value(s) at the HDMI port connected to the VCMD. However, some TV-AVRs may not comply and may maintain HPD and HDCP connections to active for a predetermined time period after powering off of the TV-AVR (e.g., for ten to thirty minutes). Similarly, when the active input of the TV-AVR is switched to a different HDMI port, the TV-AVR should also, but may not actually for a predetermined time period, update the HPD and HDCP connections. Accordingly, when the user turns off or switches the input of a non-compliant TV-AVR using a remote control of this TV-AVR, the VCMD may still detect active HPD and HDCP connections over the HDMI port and, thus, may not determine that the ON state is now an OFF state. This situation may be referred to as an "ON/Unknown" state.

The terms "in focus" and "not it focus" refer to states of the TV-AVR system, specifically whether or not the TV-AVR system is powered on with its active AV input port(s) set to the VCMD. For example, in the system shown in FIG. 3, assume that the TV-AVR system 303 includes an audio-video display device such as a TV, computer monitor, video projector or the like, and an AVR with one or more external speakers. Furthermore assume that the AV output port of VCMD 300 (VCMD_OUT_1) is connected via HDMI to an input port of the AVR (AVR_IN_1), and then an output port of the AVR (AVR_OUT_1) is connected to an input port of the TV (TV_IN_1), i.e., the HDMI connection of the entire system can be described as follows: VCMD_OUT_1→AVR_IN_1→AVR_OUT_1→TV_IN_1. In this connection topology, to be considered "in focus," the active input port of the AVR should be set to AVR_IN_1, the active output port of the AVR should be set to AVR_OUT_1, and the active input port of the TV should be set to TV_IN_1. In such a case, the VCMD can be considered to be "in focus" if the power setting of both the TV and the AVR is set to the ON state. On the other hand, if either the AVR or the TV is set to a power OFF state, the VCMD can be considered to be "not in focus." Likewise, if both the TV and the AVR are in the power ON state, but the currently active input/output ports of any of the TV-AVR system components are set to something other than VCMD_OUT_1→AVR_IN_1→AVR_OUT_1→TV_IN_1, then the VCMD can also be considered to be "not in focus." As described in more detail below, if the user utterance implies a desire to play content on the TV-AVR system 303, the VCMD 300 can provide the appropriate control signals, e.g., via IR LEDS 311 and/or HDMI port 301, to move the VCMD 300 from a "not in focus" state to an "in focus" state and such a control signal generally can include ON/OFF control signals as well as active input switching/activation signals.

As illustrated in FIG. 3, the VCMD 300 can include an audio input section that includes a microphone system 313 and input audio processing system 315. The microphone system 313 can be a microphone array system that employs an arrangement of microphones that work together to allow the VCMD 300 to locate the user in an otherwise noisy room, e.g., by using a multi-microphone beam forming technique. The microphone system 313 can also work together to improve the quality of the detected audio signal, e.g., by a detection scheme that results in echo cancellation. One possible arrangement of microphones within the microphone system 313 according to certain embodiments is described in further detail below in reference to FIG. 13.

The audio input section of VCMD 300 further includes an input audio processing system 315 that receives audio signals form the microphone system 313 and performs additional signal processing. In addition, the input audio processing system 315 can control the beamforming and echo cancellation capabilities of the microphone array. The input audio processing system 315 also includes a wakeword detection service that is configured to receive the audio input signal from the microphone system 313, also referred to herein as a microphone signal, and to detect whether or not a wakeword was present in the speech input that was received by the microphone system 313. The input audio processing system 315 includes audio capture subsystem 317 that, upon detection of the wakeword, can capture the speech input associated with the user utterance and digitize it, e.g., in the form of digital audio data such as PCM data or the like, also referred to herein as utterance data.

The input audio processing system 315 further includes a device controller 325 having a state monitor subsystem 319 that can receive the microphone signal from one or more microphones of the microphone system 313 and can determine the state of the TV-AVR system 303 based on the content of the microphone signal. For example, the VCMD 300 can send an audio probe signal to one or more speakers of the TV-AVR system 303 and the state monitor subsystem 319 can be used to determine whether or not the probe signal is present in the microphone signal in an effort to determine whether or not the VCMD is currently ON/OFF or in focus/not in focus on the TV-AVR system 303.

The VCMD 300 further includes a speech interaction manager (SIM) 320 that can coordinate one or more interactions amongst the subsystems of VCMD 300 and also can coordinate the interaction of the VCMD 300 with one or more external systems. According to certain embodiments, the SIM 320 can exchange data with a cloud-based voice recognition service (VRS) 321 such as Amazon Alexa. The SIM 320 can also coordinate with a dual mode controller (DMC) 324 to obtain the current state of the TV-AVR system (and as needed, the mode of the VCMD 300), also referred to herein as the TV-AVR system "context." For example, in response to a user utterance 305, the SIM 320 can query the DMC 324 for the TV-AVR system state. The DMC 324 can then provide the system state or can obtain it from the device controller 325. After the SIM 320 receives the TV-AVR system state, it can send an event message 322 to the VRS 321 that includes both the TV-AVR system state and the utterance data. The VRS 321 can then use a number of voice processing techniques to identify the user intent from the user utterance data.

According to certain embodiments, the VRS 321 can be one or more remote server computers running a number of voice recognition services, natural language processing (NLP) services, natural language understanding (NLU) services, and the like. According to certain embodiments, rather than being a cloud-based system, the VRS 321 can be internal to the VCMD. The VRS 321 can perform automatic speech recognition (ASR) on the utterance data and generate recognition result data, thereby converting the PCM data to a text string representing the words of the utterance. The recognition result data can then be passed to a NLU module (not shown) within the VRS 321 where NLU processing is applied to determine the user intent from the recognition result data. The VRS 321 then takes both the determined user intent and the current TV-AVR state and generates digital response data 323 that can be structured as a set of directives that are sent back to the SIM 320.

The directives can include a set of commands and/or data that represent content, instructions, commands, or any other data that allow the components of the VCMD 300 to provide content in accordance with the user intent as determined by the VRS 321. For example, the directives can include data that provides a data element, referred to herein as a TV-AVR request indication, that indicates the requested content is video content. The directives can also include a device control directive that includes an instruction to turn ON the TV and set the active input of the TV to the VCMD 300. In addition, the directives can include embedded content, e.g., text-to-speech (TTS) audio data that is generated by the VRS 321 in response to the user utterance. For example, in response to the utterance, "Alexa, play movie 'XYZ'," the VRS 321 can generate a TTS audio file that includes the response such as, "OK, here's 'XYZ'." Further, the directive can include a VCMD control direction that instructs the VCMD 300 to perform a corrective action, such as to enter a particular mode (e.g., switch to an audio mode from an AV mode), adjust a setting (e.g., change or reset a volume level of the internal speaker 309), flash lights with a particular color or pattern, and/or send control signals to the TV-AVR system 303.

The content embedded within the directives can also include one or more media payloads that represent media to be played on the TV-AVR system 303, e.g., the data associated with one or more visual graphics, such as cards, to be displayed on the screen of the TV-AVR system 303. In some cases, the directives can also include a playback instruction coupled with content source location identifier such as a uniform resource locator (URL) that directs a media player within media players module 304 to launch and begin streaming the content located at the URL.

According to certain embodiments the SIM 320 can execute the set of directives and exchange one or more messages with the DMC 324 to coordinate what output location should be used (the internal speaker 309 or the TV-AVR system 303).

According to certain embodiments, the directives 323 can include an indication, referred to herein as a TV-AVR request indication, that the requested content is, or is not, video content. This indication can take the form of a data element, e.g., a string that reads 'VIDEO' or 'AUDIO', or any other data type suitable to identify the nature of the requested content. As used herein, the term TV-AVR request refers to not only utterances that include a user request to play video on the TV screen, but also utterances that include a user request to play high-quality audio content (such as music) on the high-quality speakers of the TV-AVR system. In some embodiments, an utterance can lead to a directive that includes a TV-AVR request if, by the language of the utterance 1) it requires video output because the content requested is necessarily video content; 2) it implies a desire for high-quality audio content; 3) implies a native VCMD interaction; 4) the language of the utterance implies that the desired output is video; or 5) the utterance indicates a presentation issue and is associated with a corrective action.

As an example of case 1) above, an utterance can be determined to require video output in a situation where, according to the meaning of the language in the utterance, no other possible output modality is possible. For example, an utterance such as "Alexa, watch move 'XYZ'" or "Alexa, play movie 'XYZ'" includes an unambiguous reference to video content, the movie 'XYZ.' Likewise, an utterance such as or "Alexa, play cat videos on YouTube" requires video content, cat videos, and a content source, YouTube, that provides only video content.

As an example of case 2) above, a TV-AVR request can be identified based on a user's desire to hear music from high quality speakers, e.g., "Alexa, play 90s rock music." In this case, the VCMD may interpret this request as a TV-AVR request because the desired content is music. In some embodiments, the VCMD can default to playing a music-specific TV-AVR request through the TV-AVR speakers because these speakers can provide a superior audio quality to the internal speakers of the VCMD. In comparison, an utterance such as "Alexa, play my to-do list" will not be interpreted as a TV-AVR request because there is no need to play the requested audio on high-quality speakers of the TV-AVR system. In addition, a user may not want to wait for the TV-AVR system to be turned on and the VCMD brought into focus before they hear the to-do list audio. Accordingly, in this type of scenario, the VCMD can be configured to initiate playback of the requested audio as quickly as possible using the internal speaker of the VCMD.

In view of the above, for music-specific TV-AVR requests, the VCMD can include one or more user preference settings that indicates a default output source. For example, if the user always wants music to be played on the highest quality output device available, then the user preference setting can indicate that the VCMD should route music-specific TV-AVR requests to the TV-AVR speakers. However, if a user prefers playback speed and reliability over audio quality, the user may set the preference setting to always play music-specific TV-AVR request through the internal speakers of the VCMD.

As an example of case 3) above, an utterance can be determined to include a TV-AVR request if the utterance implies some form of native VCMD interaction, e.g., such as, "Go to my watch list" or "Rent movie 'ABC'." In these cases, the system may need to access content that is inherently associated with some form of audio-video platform or subscription service, or may imply some form of user input/interaction that requires a user to interact with content that is displayed on the screen, e.g., via a user input device such as a remote, before it can be completed.

As an example of case 4) above, a TV-AVR request can be identified because the language of the utterance implies that the desired output is video content. In such a case, certain words in the utterance can be recognized as associated with a user's intent to obtain video or visual content. For example, after the wakeword, the utterance may use the word "show" as in "Alexa, show me my commute" or "Alexa, show me my calendar."

As an example of case 5) above, the utterance (e.g., "Alexa, I can't hear you") is matched to a predefined phrase (e.g., also, "I can't hear you") or an intent indicating the presentation issue and associated with a VCMD control direction that instructs the VCMD 300 to perform a corrective action. In this case, the match can involve processing the utterance and perform phrase matching or intent matching, and the predefined phrase can be stored in a profile associated with the VCMD 300.

The VCMD 300 also includes a device controller 325. The device controller 325 includes a state monitor 319 that can monitor various TV-AVR system devices, determine their current states, and then store the state in memory or transmit the state information periodically and/or asynchronously to the DMC 324. In addition, the device controller 325 includes a device control service that can generate device control signals that can be sent to the TV-AVR system 303 via various device interconnects of the VCMD 300, e.g., the IR LEDS 311 and/or the monitor/control block 301*a* of HDMI port 301. In general, the device controller 325 can generate IR control signals in a manner that is similar to a universal remote and also can generate HDMI control signals in the form of CEC commands and the like. As would be appreciated by one of ordinary skill in the art, many different types of control signals and channels in addition to IR and CEC controls are possible without departing from the scope of the present disclosure.

The VCMD 300 also includes a speaker controller 327 and a video controller 302 that can receive audio and video data and/or commands from both the SIM 320 and the DMC 324. The speaker controller 327 can include interface hardware and software that receives data associated with the audio content and provides an audio signal to the internal speaker 309 of the VCMD 300 and/or to the audio subblock 301*c* of the HDMI port 301.

According to certain embodiments, the speaker controller 327 can source audio data from either the VRS 321 or from an external audio content source 308 such as a cloud-based streaming music service. For example, in the case of a user utterance such as, "Alexa, what's the weather report today?" audio response data can be generated by the VRS 321 and sent to the VCMD 300 as one or more audio directives. In this specific example, the SIM 320 will execute a set of directives which will cause dual mode controller 324 to direct the speaker controller 327 to route this relatively low quality audio (the weather report) to the internal speaker 309 of the VCMD 300. Other pieces of audio data may also be sent with the response data such as a TTS response that is generated by the VRS 321 in response to the utterance.

In other examples, such as an utterance like, "Alexa play music," the VRS 321 can include a music playback directive that is passed to the SIM 320. The SIM 320 can then send one or more messages to the media players module 304 to cause an audio player to launch and connect to a remote content source 308 such as a streaming music service. The music stream is then provided by the audio player to the speaker controller 327. In this case, because the audio data represents music, the speaker controller 327 will route the audio signal to the external speakers that are operatively connected to the TV-AVR system 303. For example, the speaker controller 327 can send a properly encoded audio signal via the audio sub-block 301*b* of HDMI 301.

While not shown above, the video controller 302 can source video content from either the VRS 321 or the content source 308. In addition, the SIM 320 can provide content directly to one or more video data lines of HDMI port 301, e.g., via video sub-block 301*c*. For example, in the case of an utterance such as "Alexa, show me the weather," the response data from the VRS 321 can include a visual directive that corresponds to video data associated that includes one or more cards to be displayed on the TV screen. Thus, in this case, the SIM 320 may communicate directly with the HDMI port 301. In other examples, such as for an utterance like, "Alexa, play TV show 'QRS' on platform 'TUV'," the response data from the VRS 321 can include a video playback directive. In this case the video playback directive will cause the SIM 320 to instruct the media players module 304 to launch the media player of the requested platform (e.g., a content delivery service) and to connect to the remote content source to begin streaming the video content.

Figure 4:
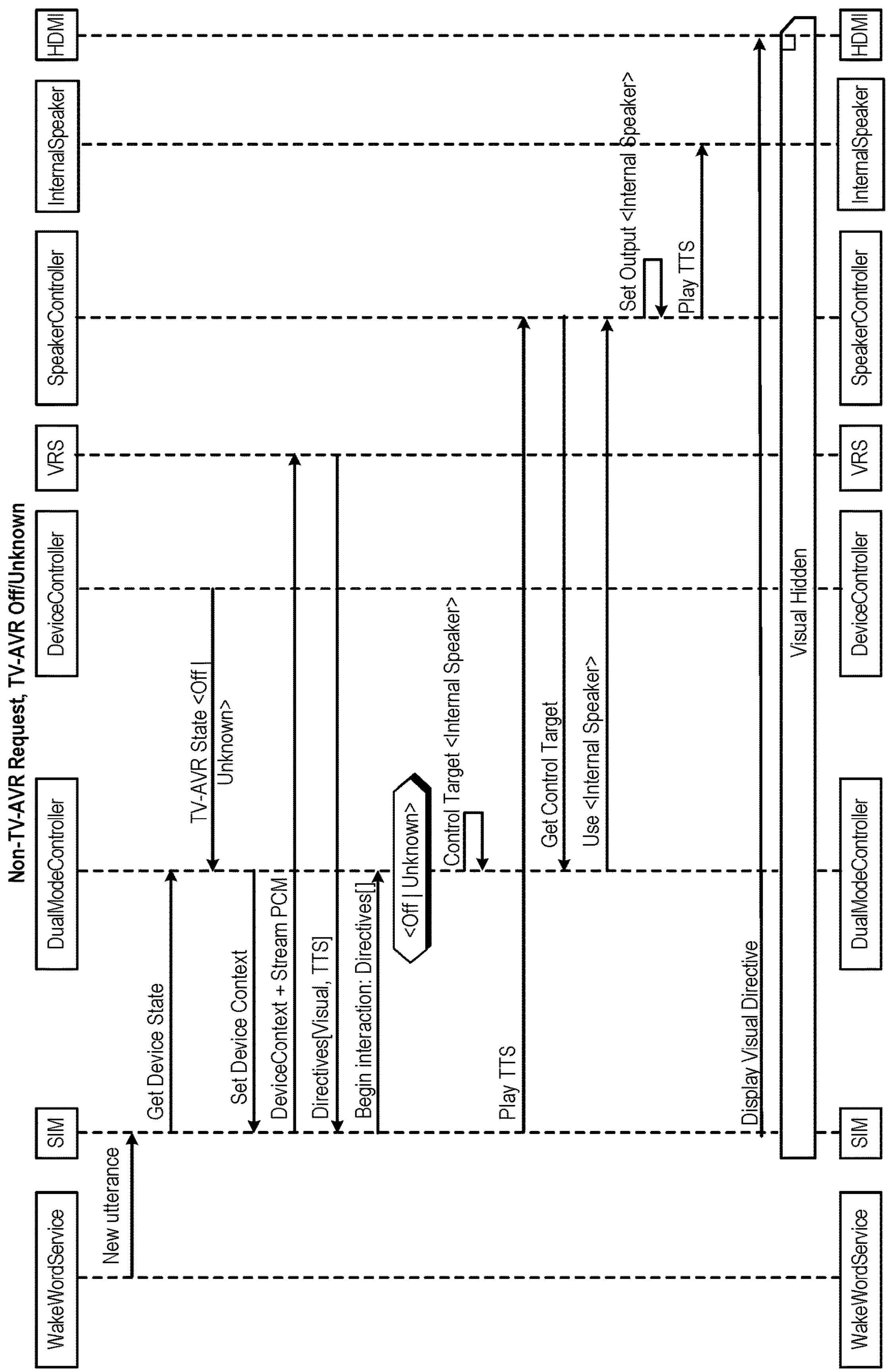
FIG. 4 shows a sequence diagram to further illustrate the method of operation of a voice-controlled multimedia device in accordance with one or more embodiments of the disclosure.

FIG. 4 shows a sequence diagram to further illustrate the method of operation of a VCMD (e.g., the VCMD 300) in accordance with one or more embodiments of the disclosure. More specifically, the sequence diagram illustrates the interaction between various subsystems of the VCMD, depending on the nature of the user utterance and on the state of the TV-AVR system at the time the utterance is received. In the examples shown in FIG. 4, the TV-AVR system is assumed to be a TV. This sequence diagram is provided merely for the sake of example and one of ordinary skill will appreciate that many different sequences are possible, depending on the user utterance, topology, and current state of the TV-AVR system.

As illustrated, an utterance that includes a non-TV-AVR request is processed based on an initial TV-AVR system state that is in either the OFF state or the ON/Unknown state. Examples of a non-TV-AVR request include utterances such as, "Alexa, what's the weather report?" For this type of non-TV-AVR requests, it is assumed that the user's intent is to not have the VCMD turn on the TV-AVR system if it is off initially. Instead, the VCMD will route the requested audio to the internal speakers of the VCMD. It should be noted that in some cases, a non-TV-AVR request can come paired with default video content, e.g., a display of one or more cards that show various weather related data. However, because of the non-TV-AVR nature of the request, the TV-AVR system will only display such video if the TV-AVR system is already on. Stated another way, the response to a non-TV-AVR request need not be pure audio. However, if the response does include audio and video, some embodiments of the VCMD can be configured to only display the video if the TV-AVR system is already on. Sending video content in this way (regardless of the state of the TV-AVR system) can help mitigate any unpleasant user experience issues if the TV-AVR state is misreported.

According to the sequence diagram of FIG. 4, at the outset, a wakeword service, which can be a detection service that is running on the input audio processing system 315 shown in FIG. 3, detects the presence of a wakeword in the ambient audio detected by the microphone. In response to the detection of the wakeword, the wakeword service notifies the SIM that a new utterance is in the process of being detected. In response to this notification, the SIM sends an audio-video power state status request to the DMC to obtain the current TV-AVR system state, shown here as a 'Get Device State' message. In some embodiments, the DMC is configured to store a current description of the device state. The device state can be updated periodically in response to state information provided by the Device Controller. According to certain embodiments, the Device Controller can accomplish this by periodically providing the DMC with the device state via a recurring message. Alternatively, the device state can be provided asynchronously by the device controller in response to a request from the DMC.

Returning to the particular example shown in FIG. 4, the device controller provides a device state of TV<Off|Unknown> to the DMC because the device controller determined that the TV is either in a power OFF state or in an ON/Unknown state.

Upon receiving the current device state information from the device controller, the DMC then sends a Set_Device_Context message to the SIM to instruct the SIM to create a Device_Context that indicates that the TV is either in the OFF or ON/Unknown state. Next, the SIM provides both the Device_Context and the PCM audio stream including the utterance data to the VRS. As mentioned above, the VRS can take the Device_Context and PCM information and generate a set of Directives, e.g., Directives [$D_1$, $D_2$, . . . , $D_n$]. According to certain embodiments, the Directives can take the form of a list of commands and one or more pieces of audio and/or video data. In this example, the directives include a command to play video consisting of one or more cards showing the weather report and also includes an instruction to play a TTS response on the internal speaker of the VCMD. In some embodiments, the TTS response can be passed down in the directive as a piece of pre-rendered PCM audio that represents the VRS's response to the user's utterance.

In response to receiving the set of directives, the SIM passes the directives to the DMC and instructs the DMC to begin its interaction according to the directives. In some embodiments, the DMC can be programed with logic that can determine the output source based on information contained in the directives, or the VRS can include the output source in the directive itself.

In this case, because this is a non TV-AVR request and the TV-AVR state is TV <Off|Unknown>, the device control logic can instruct the DMC to set its control target to <Internal Speaker> indicating that any TTS or requested audio is to be played on the internal speaker of the VCMD.

Next, the SIM can transmit a Play_TTS message to the speaker controller telling the speaker controller to begin playing the TTS audio. For example, in the case of an utterance such as, "What's the weather?" the TTS audio could be "Here's your weather report for today . . . . " In response to the Play_TTS message, the speaker controller can send a Get_Control_Target message to the DMC to obtain the current value for the Control_Target variable, in effect asking the DMC what output system the TTS audio is to be played on. In response to the Get_Control_Target message, the DMC can send a Use<Current_Control_Target> message to the speaker controller to inform the speaker controller of the currently selected output device. In this case, the internal speaker of the VCMD is the current control target, so the DMC instructs the speaker controller to use the internal speaker as the output device. The speaker controller then plays the TTS audio on the internal speaker of the VCMD.

As mentioned above, some non-TV-AVR requests can include accompanying video regardless of the state of the TV. FIG. 4 shows such an example, and therefore, after the speaker controller plays the TTS audio on the internal speaker, the SIM can cause video data to be sent to the HDMI port. In the particular case shown in FIG. 4, the TV is off and therefore the video content will be hidden from view. However, if the state of the TV happened to be reported incorrectly, the video data will be displayed thereby improving the overall user experience for cases when the TV-AVR state might be erroneous. As would be appreciated by one of ordinary skill in the art with the benefit of this disclosure, there can be alternative configurations where no visual directive is sent in response to a non-TV-AVR request without departing from the scope of the present disclosure.

FIG. 5 shows outcomes for using a VCMD based on a mode of the voice-controlled device, a power state and an activity state of a presentation device (e.g., a TV-AVR), and speech input in accordance with one or more embodiments of the disclosure. Each outcome is associated with a directive that can control how content is presented by the VCMD or sent from the VCMD to a TV-AVR for presentation thereat.

In the interest of clarity, sixteen cases are illustrated, although a different number of cases can be possible. Each case 510 corresponds to a combination of speech input 520, a VCMD mode 530, a power state 540, and an activity state 550, and can result in a particular outcome 560. The speech input 520 can include a TV-AVR request (e.g., a request for AV content, video only content, or content that cannot be presented on the internal speakers of the VCMD), or a non TV-AVR request (e.g., a request that is not a TV-AVR request, such as an audio only request or a request for content that can be fully presented by the VCMD). The VCMD mode 530 can include an audio mode or an AV mode. The power state 540 can include an ON state or an ON/Unknown state. The activity state 550 can include active (indicating that the data interface (e.g., HDMI port) of the TV-AVR connected to the VCMD is the active input of the TV-AVR) or inactive (indicating that this data interface is not the active one).

As illustrated, in the first case 510, the speech input 520, the VCMD mode 530, the power state 540, and the activity state 550 are a non TV-AVR request, audio mode, ON, and active, respectively. Accordingly, the VCMD responds to the non TV-AVR request by playing an audio response on its internal speakers as illustrated by the first outcome 560. That is because the VCMD is already in the audio mode and the speech input 520 does not necessitate a presentation of a response at the TV-AVR. Instead, playing audio over the internal speakers of the VCMD suffices.

In the second case 510, the speech input 520, the VCMD mode 530, the power state 540, and the activity state 550 are a non TV-AVR request, audio mode, ON, and inactive, respectively. Accordingly, the VCMD responds to the non TV-AVR request by playing an audio response on its internal speakers as illustrated by the second outcome 560. That is also because the VCMD is already in the audio mode and the speech input 520 does not necessitate a presentation of a response at the TV-AVR. Instead, playing audio over the internal speakers of the VCMD suffices.

In the third case 510, the speech input 520, the VCMD mode 530, the power state 540, and the activity state 550 are a non TV-AVR request, audio mode, ON/Unknown, and active, respectively. Accordingly, the VCMD responds to the non TV-AVR request by playing an audio response on its internal speakers as illustrated by the third outcome 560. That is also because the VCMD is already in the audio mode and the speech input 520 does not necessitate a presentation of a response at the TV-AVR. Instead, playing audio over the internal speakers of the VCMD suffices.

In the fourth case 510, the speech input 520, the VCMD mode 530, the power state 540, and the activity state 550 are a non TV-AVR request, audio mode, ON/Unknown, and inactive, respectively. Accordingly, the VCMD responds to the non TV-AVR request by playing an audio response on its internal speakers as illustrated by the fourth outcome 560. That is also because the VCMD is already in the audio mode and the speech input 520 does not necessitate a presentation of a response at the TV-AVR. Instead, playing audio over the internal speakers of the VCMD suffices.

In the fifth case 510, the speech input 520, the VCMD mode 530, the power state 540, and the activity state 550 are a non TV-AVR request, AV mode, ON, and active, respectively. Accordingly, the VCMD responds to the non TV-AVR request by pausing the content currently being streamed to the TV-AVR, sending an audio response to the TV-AVR (e.g., streams the requested audio to the TV-AVR or sends a URL of the audio source), and, optionally, resuming the content stream once the audio response is fully played as illustrated by the fifth outcome 560. Here, because the VCMD is in the AV mode and capable of streaming to the TV-AVR system and because this system is ON and its data interface to the VCMD is active, the audio response is sent to the TV-AVR for presentation thereat.

In the sixth case 510, the speech input 520, the VCMD mode 530, the power state 540, and the activity state 550 are a non TV-AVR request, AV mode, ON, and inactive, respectively. Accordingly, the VCMD responds to the non TV-AVR request by playing an audio response on its internal speakers as illustrated by the sixth outcome 560. Here, and unlike the fifth case, the data interface of the TV-AVR to the VCMD is inactive (e.g., the user may have switched the TV-AVR input to a device other than the VCMD). Accordingly, a data path to send the audio response to the TV-AVR is not available (unless the VCMD sends a control signal(s) to the TV-AVR to switch its input to the data interface). Because the data path is not available, the VCMD switches to the audio mode and plays the audio response on its internal speakers.

In the seventh case 510, the speech input 520, the VCMD mode 530, the power state 540, and the activity state 550 are a non TV-AVR request, AV mode, ON/Unknown, and active, respectively. Here, the VCMD may not be aware that the TV-AVR is actually powered off because the TV-AVR's activity state indicates that it is active (reasons for this lack of awareness are further described herein below and relate to how the TV-AVR may implement the data interface (e.g., may comply with the HDMI specifications)). Because the VCMD expects that a data path exists, the VCMD responds to the non TV-AVR request by sending an audio response to the TV-AVR (e.g., streams the requested audio to the TV-AVR or sends a URL of the audio source) as illustrated by the seventh outcome 560.

In the eighth case 510, the speech input 520, the VCMD mode 530, the power state 540, and the activity state 550 are a non TV-AVR request, AV mode, ON/Unknown, and inactive, respectively. Accordingly, the VCMD responds to the non TV-AVR request by playing an audio response on its internal speakers as illustrated by the eighth outcome 560. That is also because no data path exists for the VCMD to send the audio response to the TV-AVR.

In the ninth case 510, the speech input 520, the VCMD mode 530, the power state 540, and the activity state 550 are a TV-AVR request, audio mode, ON, and active, respectively. Accordingly, the VCMD switches to the video mode, responds to the TV-AVR request by sending an AV response to the TV-AVR for presentation thereat as illustrated by the ninth outcome 560. That is because the request is for AV content and an audio response on the VCMD's internal speakers is not sufficient.

In the tenth case 510, the speech input 520, the VCMD mode 530, the power state 540, and the activity state 550 are a TV-AVR request, audio mode, ON, and inactive, respectively. In this case, the VCMD plays a TTS message over its internal speakers that the requested AV content will be played at the TV-AVR, switches to the video mode, and sends an AV response to the TV-AVR for presentation thereat as illustrated by the tenth outcome 560. That is because the request is for AV content and an audio response on the VCMD's internal speakers is not sufficient. The TTS message may help managing the user's expectation that the AV content is about to start playing during the time period needed for changing the TV-AVR input to the data interface connected to the VCMD.

In the eleventh case 510, the speech input 520, the VCMD mode 530, the power state 540, and the activity state 550 are a TV-AVR request, audio mode, ON/Unknown, and active, respectively. In this case, the VCMD plays a TTS message over its internal speakers that the requested AV content will be played at the TV-AVR, switches to the video mode, sends control signals to power the TV-AVR on, and sends an AV response to the TV-AVR for presentation thereat as illustrated by the eleventh outcome 560. That is because the request is for AV content and an audio response on the VCMD's internal speakers is not sufficient. The TTS message may help managing the user's expectation that the AV content is about to start playing during the time period needed for turning the TV-AVR on.

In the twelfth case 510, the speech input 520, the VCMD mode 530, the power state 540, and the activity state 550 are a TV-AVR request, audio mode, ON/Unknown, and inactive, respectively. In this case, the VCMD plays a TTS message over its internal speakers that the requested AV content will be played at the TV-AVR, switches to the video mode, sends control signals to power on the TV-AVR and to set its input to the data interface connected to the VCMD, and sends an AV response to the TV-AVR for presentation thereat as illustrated by the twelfth outcome 560. That is because the request is for AV content and an audio response on the VCMD's internal speakers is not sufficient. The TTS message may help managing the user's expectation that the AV content is about to start playing during the time period needed for turning the TV-AVR on and setting the TV-AVR input to the data interface connected to the VCMD.

In the thirteenth case 510, the speech input 520, the VCMD mode 530, the power state 540, and the activity state 550 are a TV-AVR request, AV mode, ON, and active, respectively. Accordingly, the VCMD responds to the TV-AVR request by pausing the content currently being streamed to the TV-AVR, sending an AV response to the TV-AVR (e.g., streams the requested AV content to the TV-AVR or sends a URL of the AV content source), and, optionally, resuming the content stream once the AV response is fully played as illustrated by the thirteenth outcome 560. Here, because the VCMD is in the AV mode and capable of streaming to the TV-AVR system and because this system is ON and its data interface to the VCMD is active, the AV response is sent to the TV-AVR for presentation thereat.

In the fourteenth case 510, the speech input 520, the VCMD mode 530, the power state 540, and the activity state 550 are a TV-AVR request, AV mode, ON, and inactive, respectively. Accordingly, the VCMD responds to the TV-AVR request by sending control signals to set the TV-AVR input to the data interface connected to the VCMD, and sending an AV response to the TV-AVR for presentation thereat as illustrated by the fourteenth outcome 560.

In the fifteenth case 510, the speech input 520, the VCMD mode 530, the power state 540, and the activity state 550 are a TV-AVR request, AV mode, ON/Unknown', and active, respectively. Here, the VCMD may not be aware that the TV-AVR is actually powered off because the TV-AVR's activity state indicates that it is active. Because the VCMD expects that a data path exists, the VCMD responds to the TV-AVR request by sending an AV response to the TV-AVR as illustrated by the fifteenth outcome 560.

In the sixteenth case 510, the speech input 520, the VCMD mode 530, the power state 540, and the activity state 550 are a TV-AVR request, AV mode, ON/Unknown, and inactive, respectively. In this case, the VCMD sends control signals to power on the TV-AVR and to set its input to the data interface connected to the VCMD, and sends an AV response to the TV-AVR for presentation thereat as illustrated by the sixteenth outcome 560. That is because the request is for AV content and an audio response on the VCMD's internal speakers is not sufficient.

In the fifth, seventh, thirteenth, and fifteenth cases above (shown with either an italicized font or a bolded font for the purpose of ease of identification in FIG. 5), the user may perceive a presentation issue with the VCMD. Different reasons may exist for the presentation issue. One reason relates to how the TV-AVR implements the data interface specification. For example and within the context of using HDMI, upon powering off, the TV-AVR should the HPD and HDCP connections to inactive. However, some TV-AVRs may not comply and may maintain these connections as active for a predetermined time period after the powering off (e.g., for ten to thirty minutes). Similarly, when the active input is switched to a different HDMI port, the TV-AVR should also update the HPD and HDCP connections to inactive. However here also, some TV-AVRs may not effectuate this update. Accordingly, when the user turns off or switches the input of a non-compliant TV-AVR using a remote control of this TV-AVR (rather than a remote control of the VCMD or a voice command to the VCMD), the VCMD may still detect active HPD and HDPC connections over the HDMI port and determine that the HDMI port is active and an HDMI path for sending content to the TV-AVR is still available during that time period.

In the fifth case (shown with the italicized font in FIG. 5), the presentation issue may occur because, for instance, the VCMD is in the AV mode, the TV-AVR was in an ON state, the user then used the TV-AVR's remote control to switch to a different input than the data interface connected to the VCMD, and the activity timer has not expired yet. In other words, the VCMD detects the non-compliant high voltage value(s) and that no content has been sent to the TV-AVR for some time (e.g., for the last five minutes, there has been no activity over the data interface). However, because the VCMD is in the AV mode, the TV-AVR was in the ON state, the activity timer has not expired (e.g., the activity timer is set to fifteen minutes, where upon its elapse, a screen saver would be presented), and the high voltage value(s) is detected, the VCMD determines that the data interface is still active in the AV mode, when it is not.

In the seventh and fifteenth cases (shown with the bolded font in FIG. 5), the presentation issue may occur because, for instance, the VCMD is in the AV mode, the TV-AVR was in an ON state and then the user used the TV-AVR's remote control to turn off the TV-AVR. The VCMD detects the non-compliant high voltage value(s) some time (e.g., for the next ten minutes). Because the VCMD is in the AV mode, the TV-AVR was in the ON state and the high voltage value(s) is detected, the VCMD determines that the data interface is still active in the AV mode, when it is not.

The specific input speech associated with a corrective action (e.g., "Alexa, I can't hear you") helps with the resolution or mitigation of the presentation issue. In particular, upon receiving such an utterance, the VRS of the VCMD can initiate a directive to perform the corrective action, such as to switch to the audio mode from the AV mode and reset the volume level of the VCMD's internal speakers.

FIGS. 6-11 show example flows for presenting content by a presentation system that includes a VCMD and a TV-AVR in accordance with one or more embodiments of the disclosure. Some or all of instructions for performing the steps of the illustrative flows can be implemented as hardware circuitry and/or stored as computer-readable instructions on a non-transitory computer-readable medium of the VCMD. As implemented, the instructions represent modules that include circuitry or code executable by a processor(s) of the VCMD. The use of such instructions configures the VCMD to perform the specific operations described herein. Each circuitry or code in combination with the processor represents a means for performing a respective step(s). While the steps are illustrated in a particular order, it should be understood that no particular order is necessary and that one or more steps may be omitted, skipped, and/or reordered. Further, although the flows are described in connection with the VCMD, some of the steps may be performed by a remote computer sever operatively connected to the VCMD, or may be distributed between the VCMD and such a server.

Figure 6:
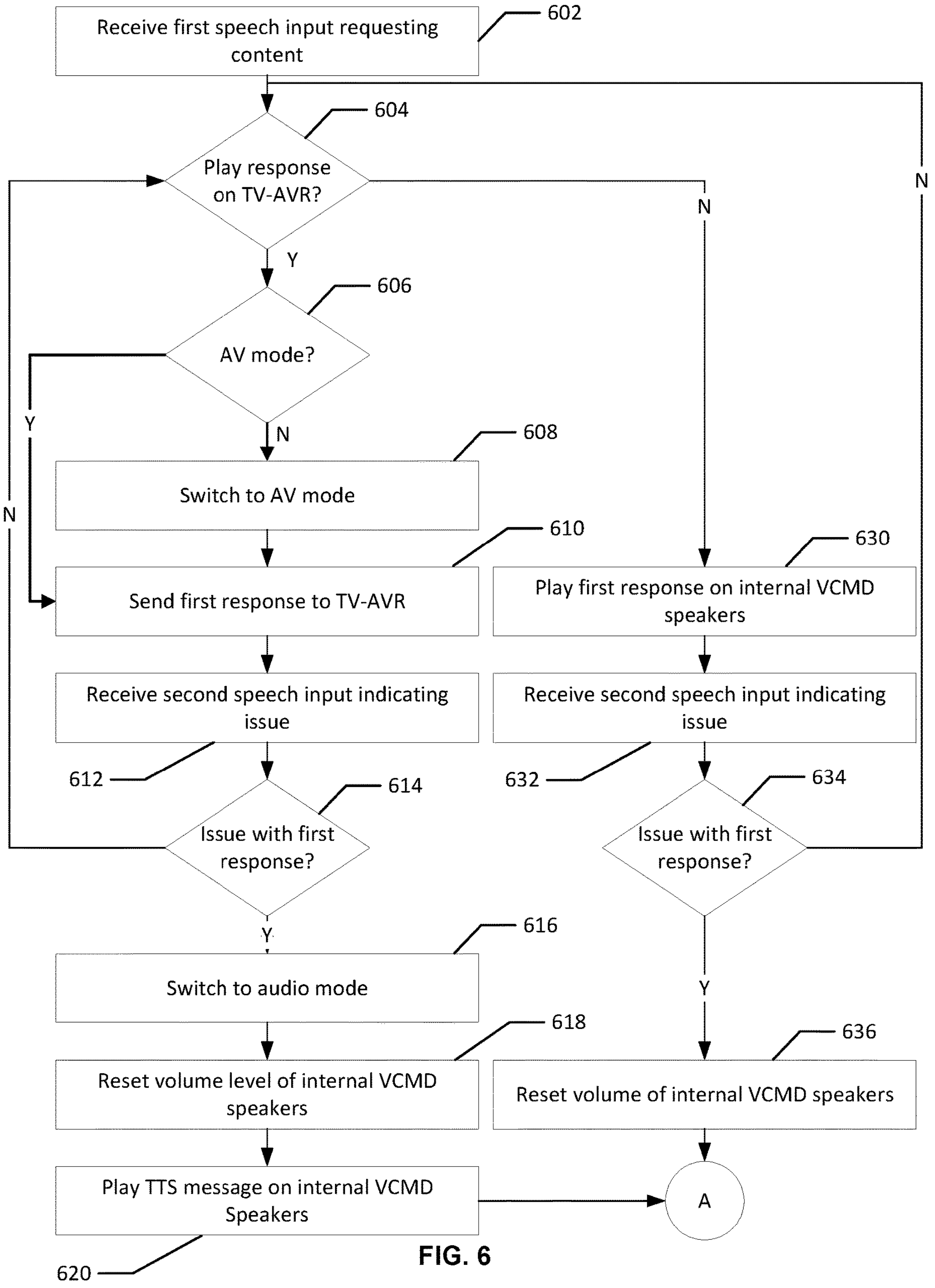
FIG. 6 shows an example flow for presenting content and switching between modes of a voice-controlled multimedia device in accordance with one or more embodiments of the disclosure.

FIG. 6 shows an example flow for presenting content and switching between modes of a VCMD in accordance with one or more embodiments of the disclosure. As illustrated, the flow starts at step 602, where the VCMD receives first speech input requesting content. In an example, the first speech input is received at the VCMD's microphone, includes a wakeword and a user utterance that requests particular audio, video, or AV content.

In step 604, the VCMD determines whether to play a response on the TV-AVR. In an example, this determination depends on a number of factors. The factors include the type of the requested content (e.g., audio only, video only, or audio and video), the mode of the VCMD, and the power and activity states of the TV-AVR. Generally, if the request is for audio only and the VCMD is in an audio mode, the VCMD determines that the response need not be played on the TV-AVR and can be routed to its internal speakers. In this case, step 630 may follow step 604. If the request is for audio only and the VCMD is in the AV mode, and no active data path to the TV-AVR currently exists, the VCMD determines that the internal routing to its speakers is sufficient and, accordingly, step 630 may follow step 604. If the request is for audio only and the VCMD is in the AV mode, but an active data path to the TV-AVR currently exists, the VCMD determines that an audio response can be sent to the TV-AVR. In this case, step 606 may follow step 604. In other cases where video or AV content is requested, the VCMD may also determine that a video or AV response should be sent to the TV-AVR and, accordingly, step 606 may follow step 604. In such cases, if the VCMD is not in the AV mode and/or the TV-AVR is not in an ON state or has an inactive data interface, the VCMD may switch to the AV mode and/or send the proper control signals to the TV-AVR. Such operations are further illustrated in FIGS. 8-11.

In step 606, the VCMD has already determined that the response should be played at the TV-AVR (e.g., the response contains video or AV content). Accordingly, in step 606, the VCMD determines whether it is in the AV mode or not. In an example, a dual mode controller (DMC) of the VCMD, (e.g., the DMC 324 of the VCMD 300) maintains the mode. A speech interaction manager (SIM) of the VCMD (e.g., the SIM 320 of the VCMD 300) queries the DMC for the mode and initiates, as needed, a directive to switch between modes. If not in the AV mode, step 608 may follow step 606. Otherwise, step 610 may follow step 606.

In step 608, the VCMD is not already in the AV mode. Accordingly, in step 608, the VCMD switches to the AV mode. In an example, the SIM initiates the directive to switch to this mode. The directive includes commands to send control signals for powering on the TV-AVR and setting it active to input to the data interface of the VCMD (e.g., the connected HDMI port), and start routing content to the TV-AVR over the data interface, as applicable.

In step 610, the VCMD sends a first response to the TV-AVR. In an example, the first response includes the requested video or AV content, or a URL link to the content source based on the first speech input. This response is sent to the TV-AVR over the data interface.

In step 612, the VCMD receives second input indicating an issue with the first response. In an example, the second speech input that is received at the VCMD's microphone, includes the wakeword and a user utterance that indicates the requested content was not perceived (e.g., "Alexa, I can't hear you").

In step 614, the VCMD determines whether an issue exists with the presentation of the first response. In an example, the VCMD performs this determination by processing the second speech input. This processing may include matching the user utterance (e.g., "I can't hear you") with a predefined phrase or an intent indicating the issue and associated with a corrective action. Based on the match, the VCMD determines that the first response may not have been properly played at the TV-AVR for the user. In this case, operation 616 may follow operation 614. However, if the user utterance is not matched to the predefined phrase or the intent, then the user utterance is for other content (e.g., the user utterance of "play movie 'XYZ'," was received in step 612 instead of "I can't hear you"). In this case, step 604 may follow step 614, indicating a loop to determine whether to play the next response at the TV-AVR or the internal speakers.

In step 616, the VCMD switches to the audio mode based on the determination that the presentation issue exists. In an example, the corrective action includes switching to the audio mode. The SIM of the VCMD initiates a directive for the switch including, for instance, commands to stop routing content to the TV-AVR and to, instead, route the content to the internal speakers of the VCMD.

In step 618, the VCMD resets the volume level of internal speakers. In an example, the corrective action also includes resetting the volume level to a default level. The SIM of the VCMD instructs a speaker controller of the VCMD (e.g., the speaker controller 327 of the VCMD 300) to adjust the volume level.

In step 620, the VCMD plays a TTS message on the internal speakers of the VCMD. In an example, the TTS message indicates to the user that subsequent responses would be played at internal speakers (e.g., the TTS includes "Okay, I'll talk to you here").

In step 630, the VCMD has already determined that the first response to the first speech input should be played at its internal speaker (e.g., the response contains audio only). Accordingly, in step 630, the VCMD accesses the requested audio from the relevant content source and plays the audio on its internal speakers. In this step, the VCMD operates in the audio mode.

In step 632, the VCMD receives second input indicating an issue with the first response. This step is similar to step 612.

In step 634, the VCMD the VCMD determines whether an issue exists with the presentation of the first response. This step is similar to step 614. Here however, because the first speech input did not request video or AV content and the VCMD did not send such content to the TV-AVR for presentation thereat, the presentation issue may be local to the VCMD and may relate to the volume level of its internal speakers. Accordingly, a corrective action here may be to reset or adjust the volume level to a default or a predefined volume.

In step 636, the VCMD resets the volume level of internal speakers. This step is similar to step 618, whereby the volume level is adjusted.

Figure 7:
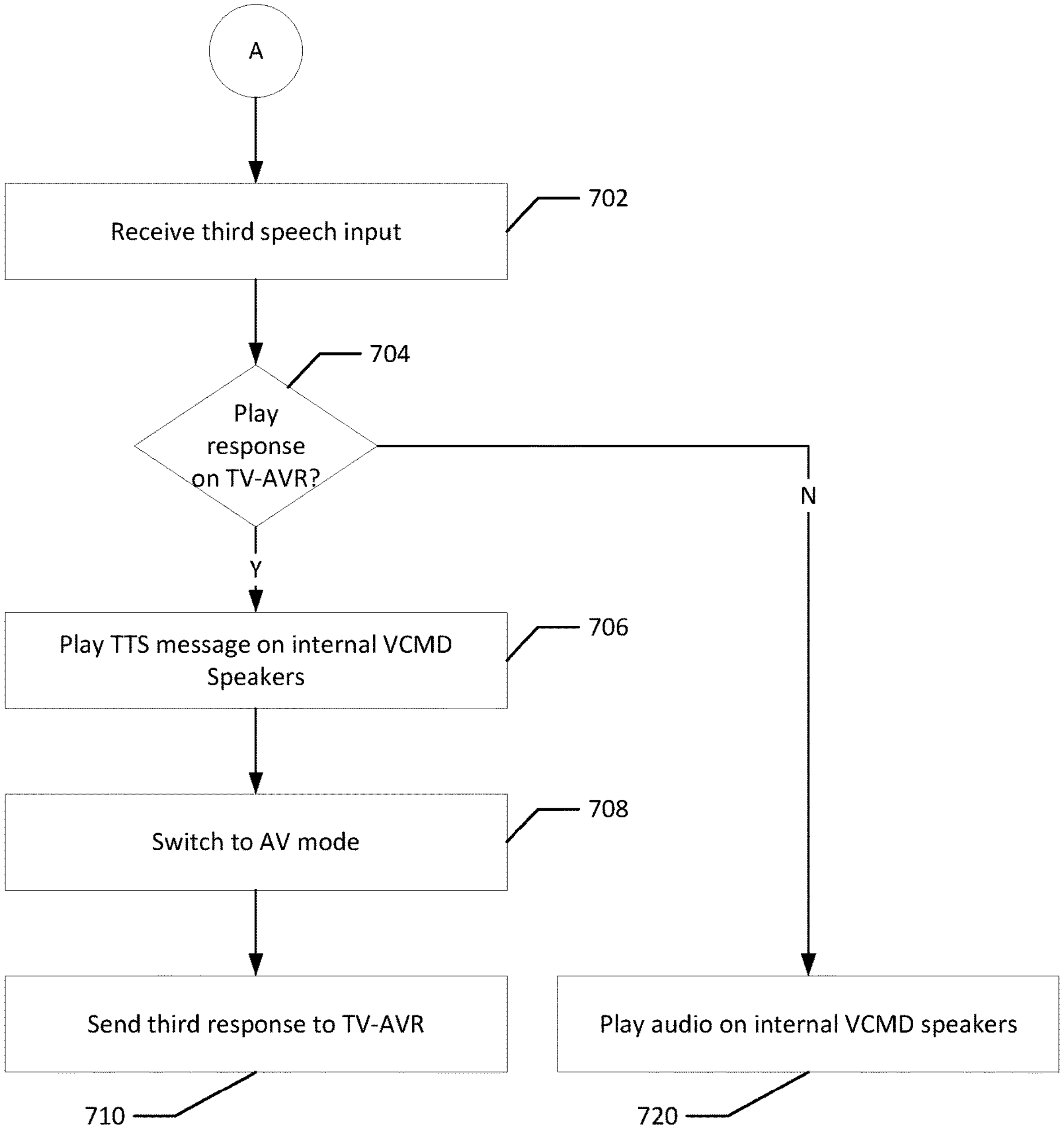
FIG. 7 shows an example flow for presenting additional content following a user utterance indicating a presentation issue in accordance with one or more embodiments of the disclosure.

FIG. 7 shows an example flow for presenting additional content following a user utterance indicating a presentation issue in accordance with one or more embodiments of the disclosure. In particular, this flow may be followed after either step 620 or step 636 of FIG. 6. For instance, after receiving the "Alexa, I can't hear you" speech input and the VCMD has performed the applicable corrective action, the VCMD may receive one or more requests from the user for additional content. As illustrated in the flow of FIG. 7, a third speech input corresponds to one of these requests.

The flow start at step 702, where the VCMD receives the third speech input. In an example, the third speech input is received at the VCMD's microphone, includes the wakeword and a user utterance that requests particular audio, video, or AV content.

In step 704, the VCMD determines whether to play a response on the TV-AVR. In an example, this determination depends on a number of factors. Here, the factors include the type of the requested content (e.g., audio only, video only, or audio and video). In particular, the VCMD is already in the audio mode (e.g., upon the switch thereto in step 616 or given that the VCMD was already in this mode in step 630 of FIG. 6). Accordingly, if the request is for audio only, the VCMD determines that the response need not be played on the TV-AVR and can be routed to its internal speakers. In this case, step 720 may follow step 704. However, if the request is for video or AV content, the VCMD determines that a video or AV response should be sent to the TV-AVR and, accordingly, step 706 may follow step 704.

In step 706, the VCMD has already determined that the response should be played at the TV-AVR (e.g., the response contains video or AV content). Accordingly, in step 706, the VCMD plays a TTS message at its internal speakers. In an example, the TTS message indicates to the user that the requested content is about to start playing at the TV-AVR. The VCMD may play this TTS message at the volume level as adjusted in step 618 or step 636 of FIG. 6.

In step 708, the VCMD switches to the AV mode from the audio mode. In an example, the SIM of the VCMD initiates a directive to switch to this mode. The directive includes commands to send control signals for powering on the TV-AVR and setting it active input to the data interface of the VCMD (e.g., the connected HDMI port), and start routing content to the TV-AVR over the data interface, as applicable.

In step 710, the VCMD sends a third response to the TV-AVR. In an example, the third response includes the requested video or AV content, or a URL link to the content source based on the third speech input. This response is sent to the TV-AVR over the data interface.

In step 720, the VCMD has already determined that the third response to the third speech input should be played at its internal speaker (e.g., the response contains audio only). Accordingly, in step 720, the VCMD accesses the requested audio from the relevant content source and plays the audio on its internal speakers. The audio can be played at the volume level as adjusted in step 618 or step 636 of FIG. 6.

Figure 8:
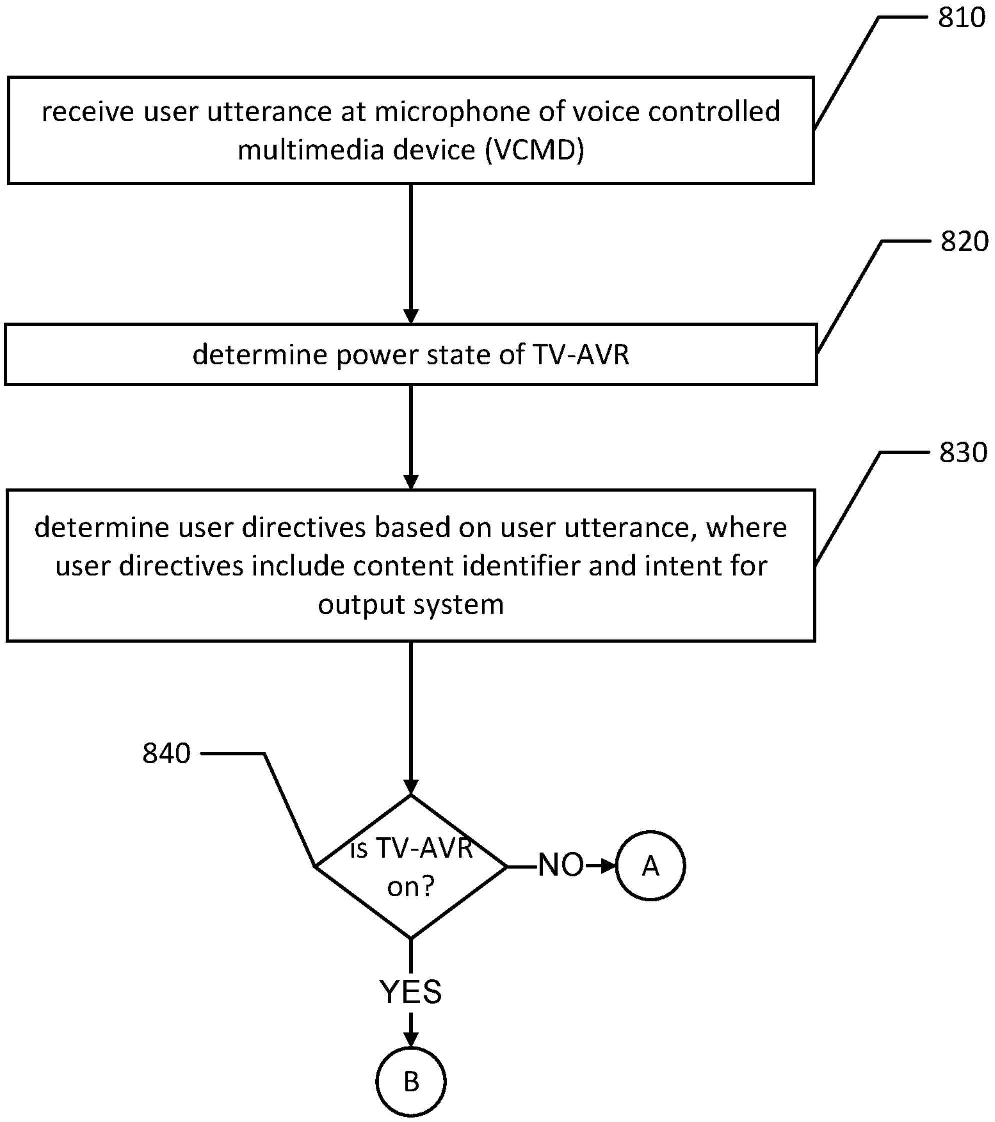
FIG. 8 shows an example flow for presenting a response by a voice-controlled multimedia device in accordance with one or more embodiments of the disclosure.

FIG. 8 shows an example flow for presenting a response by the VCMD in accordance with one or more embodiments of the disclosure. In step 810, a user utterance is received at the microphone of the VCMD. An utterance usually begins with a wakeword, e.g., "Alexa" that upon detection by the VCMD, indicates to the VCMD that a user voice command will be forthcoming. For example, user utterances can be statements that communicate a user's intent to hear audio content, such as "Alexa, play some jazz music" or "Alexa, play my flash briefing." In other examples, user utterances can be statements that communicate a user's intent to view video content, such as "Alexa, show me my shopping list" or "Alexa, show me my flash briefing."

In step 820, the VCMD determines the power state of the TV-AVR system that is operatively connected to the VCMD. For example, a television may be connected via the HDMI port of the VCMD. In some examples, an audio-video receiver and television may both be connected, as well as one or more external speakers. In order to generate the proper device control commands to effectuate the intent of the user's utterance on the TV-AVR system, the VCMD needs to be aware of the power state of the TV-AVR system. In some embodiments, the state of the TV-AVR system can be determined via signals that can be read from one or more pins of an AV interconnect, such as an HDMI port. In other examples, the state of the TV-AVR system can be determined by sending a sub-audible audio signal to the TV-AVR system via the AV interconnect, and then listening for the sub-audible signal on one or more microphones of the VCMD. In either case, one or more embodiments may initiate an audio-video power state status request message to initiate the state detection process. Additionally or alternatively, the state may be maintained by the DMC of the VCMD (e.g., the DMC 325 of the VCMD 300).

In step 830, the VCMD determines, from the utterance audio data, a set of directives that represent the user's intent. In some embodiments, the utterance audio data is passed to a voice recognition service where the voice recognition process can be performed on the utterance audio data in order to extract the intent of the user and build a set of directives. The directives can be a series of commands and can also include audio and/or video directives that include digital audio and/or video data. The directives can indicate both the content that should be played, e.g., "jazz music," and the intended output system to be used for the request, e.g., whether or not the user's intent reflects a TV-AVR request or a non-TV-AVR request. In some embodiments, as also described above in reference to FIG. 3, the voice recognition process can be performed remotely from the VCMD at an external voice recognition system including one or more voice recognition servers. In other embodiments, all or part of the voice recognition process can be performed locally on the VCMD.

In step 840, a decision is made by the VCMD based on the state of the TV-AVR system. If the TV-AVR system is in the OFF state, the method proceeds to the example flow of FIG. 9. If the TV-AVR system is in the ON state, the method proceeds to the example flow of FIG. 10.

Figure 9:
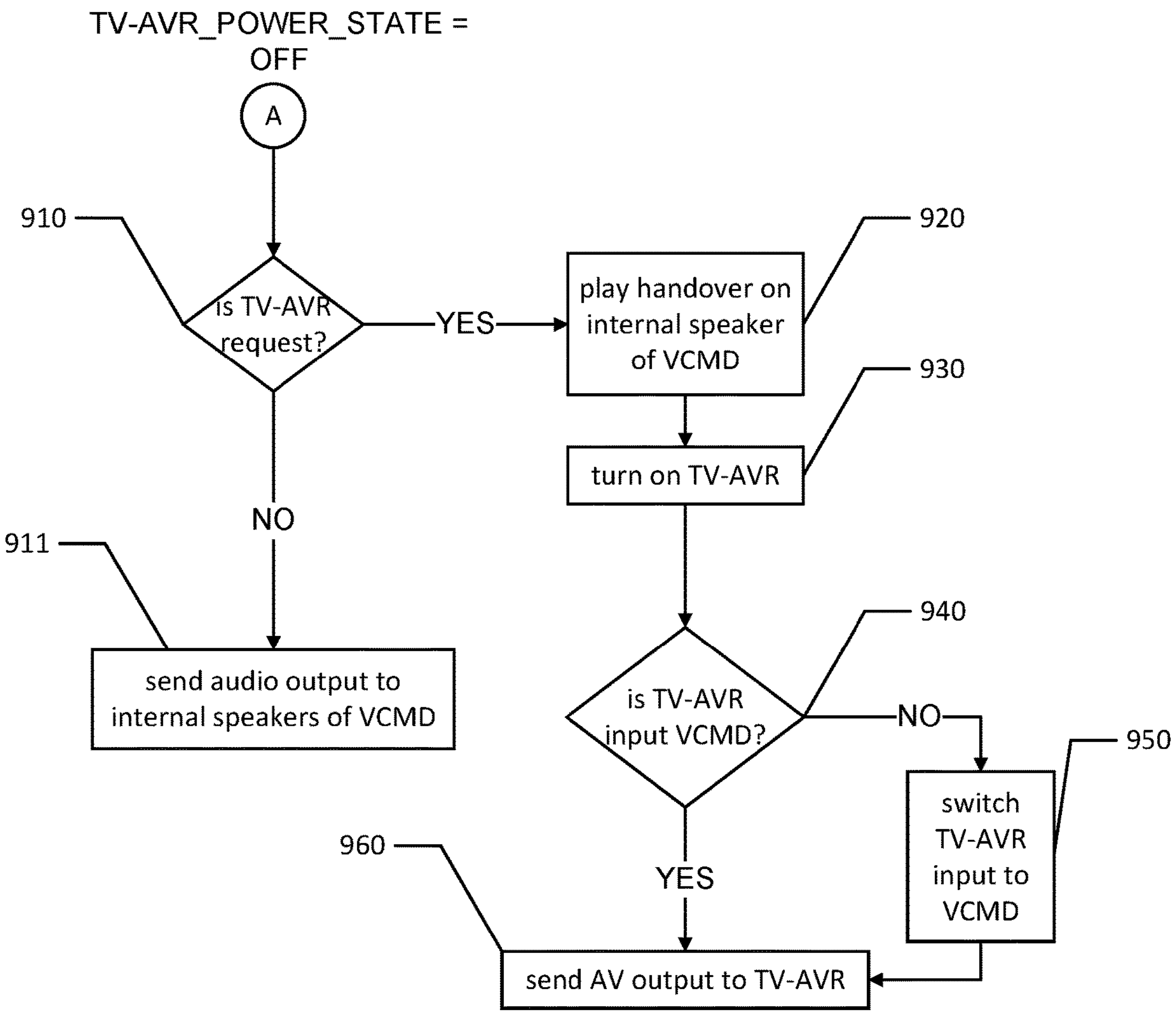
FIG. 9 shows an example flow for presenting a response by a voice-controlled multimedia device when a presentation device is in a power off state in accordance with one or more embodiments of the disclosure.

FIG. 9 shows an example flow for presenting a response by the VCMD when a presentation device is in a power off state in accordance with one or more embodiments of the disclosure. In step 910, the VCMD determines whether or not the directives include a TV-AVR request.

If the VCMD determines that the directives include a TV-AVR request, then in step 920 a handover audio message is played on the internal speaker of the VCMD. As used herein a handover audio message is an audio message that is played by the VCMD to indicate to the user that the VCMD is going to play the requested content on the TV-AVR system. For example, the VCMD can quickly state, "OK, playing that on your television" in response to a user utterance of "Alexa, play movie 'XYZ'." Such a handover audio message can improve the user experience because for some TV-AVR systems, it may take several seconds or even tens of seconds for the VCMD to put the TV-AVR system in the appropriate playback state. For example, in some instances, the VCMD may first have to switch ON the TV, then switch ON the AVR, and finally switch the active inputs of both the TV and the AVR to the VCMD before any TTS response indication can be played on the speakers of the TV-AVR system. In such a case, rather than keeping a user sitting in silence as this process completes (or fails to complete), the handover audio message from the VCMD notifies the user that the utterance has been received and that the VCMD has initiated the process of playing content on the TV-AVR system. Furthermore, the use of the handover audio message improves the user's ability to recognize that there may be a problem with the TV-AVR system if no action is taken by the TV-AVR system for a long time, e.g., more than a minute, after the handover audio message has been played.

In step 930, the VCMD then sends a control signal to the TV-AVR system in order to turn on the component(s) of the system. For example, the VCMD can be connected via an HDMI port to a TV of the TV-AVR system and can send a "power on" command via HDMI-CEC to turn on the TV. In other situations the VCMD can use its IR transmitters to send one or more control signals via IR, similar to a universal remote. In some embodiments, the control signal may be formulated to turn on only the television or may turn on other components of the TV-AVR system as well. For example, in the case of a TV-AVR system that includes both an audio-video receiver and a TV, the control request may include a combination of control signals to, e.g., first turn on the receiver and then turn on the TV. As would be appreciated by one of ordinary skill in the art with the benefit of this disclosure, several different forms of control signals are possible depending on the topology of the TV-AVR system.

In step 940, the VCMD tests whether or not the AV input of the TV-AVR system is set to the proper input port, i.e., that the active AV input of the TV-AVR system is switched to the AV port that is currently connected to the VCMD. Such a test can be accomplished by, e.g., the VCMD sending an audio-video input state status request with a GetDeviceState message. For example, if the VCMD is connected to the HDMI_1 port of the television, the VCMD first queries TV-AVR system to identify the whether or not the currently active AV input port is HDMI_1.

In step 950, if the active AV port is not already set to HDMI_1, the VCMD sends a control signal to switch the AV input of the TV-AVR system to HDMI_1. In another example, the VCMD need not detect the active HDMI port but instead can immediately send a control signal to the TV-AVR system that switches the active AV port of the TV-AVR system to the appropriate port, e.g., by employing a technology such as CEC One Touch Play.

In step 960, the VCMD then sends the requested audio-video content to the TV-AVR system, thereby completing the user's request.

Returning to step 940, if the AV port of the TV-AVR system is already set to the port that is connected to the VCMD, e.g., HDMI_1 in this example, then the process does not need to switch the AV inputs and instead proceeds to step 960 and completes.

Returning to step 910, if the VCMD determines that the directives include a request to play audio content only, then, in step 911, the VCMD can play the requested audio content on the internal speakers of the VCMD. In some embodiments, the VCMD may include a user preference setting that can override the default behavior in step 911 and instead treat the audio request like a TV-AVR request, in which case the VCMD can proceed through steps 920-960 as described above. In such a case, it also may be possible for the user to set the user preference setting to treat only certain audio requests as TV-AVR requests, e.g., an utterance such as, "Alexa, play 90s rock music" can be interpreted by the VCMD as a music request to be played on the high-quality speakers of the TV-AVR system, but an utterance such as, "Alexa, play my To-Do list" can still be played on the internal speaker of the VCMD. An embodiment having the user preference functionality is described in further detail below in reference to FIG. 11.

Figure 10:
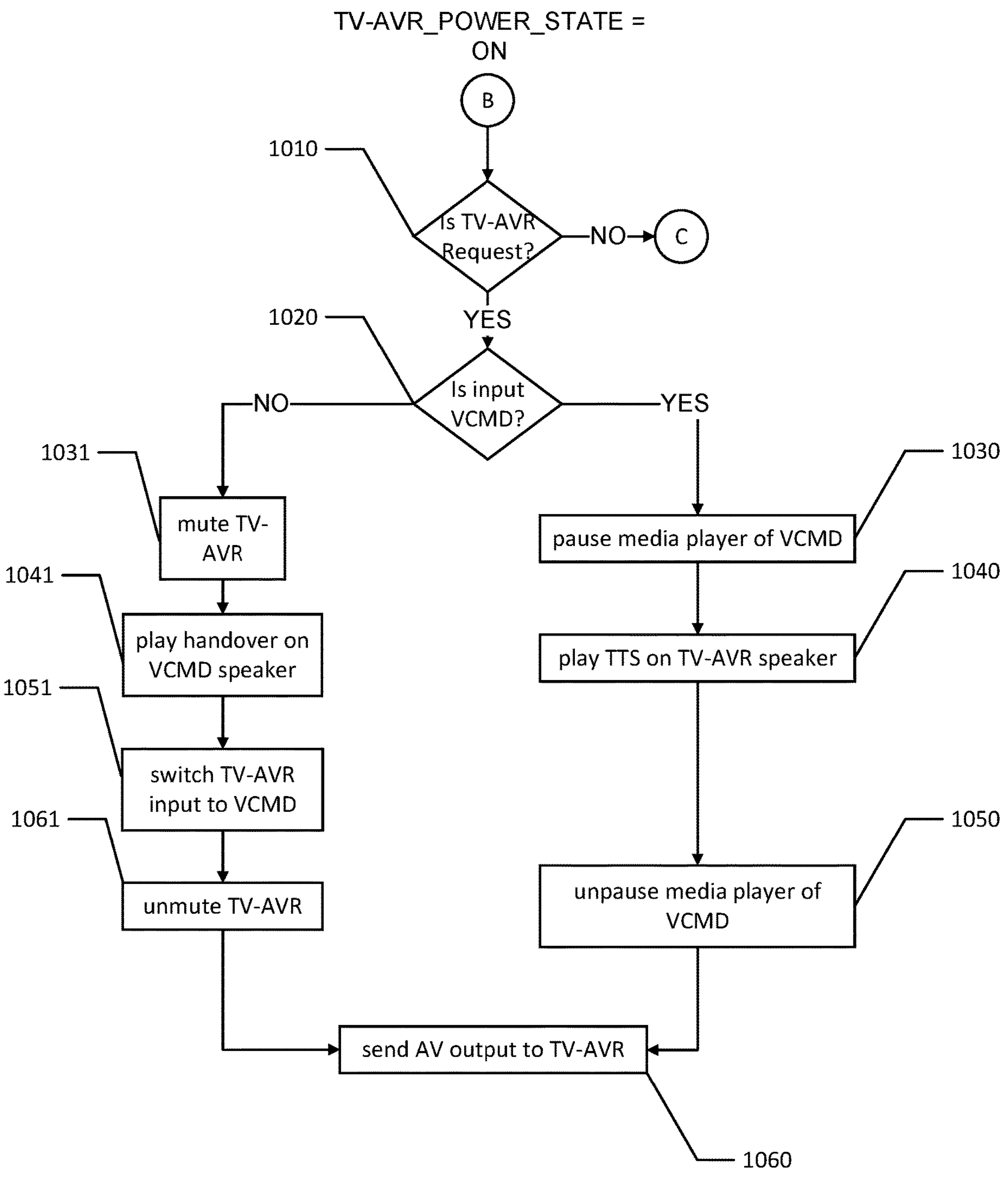
FIG. 10 shows an example flow for presenting a response by a voice-controlled multimedia device when a presentation device is in a power on state in accordance with one or more embodiments of the disclosure.

FIG. 10 shows an example flow for presenting a response by the VCMD when a presentation device is in a power on state in accordance with one or more embodiments of the disclosure. In particular, if the VCMD detects that the TV-AVR system is initially in the ON state, it can interact with the TV-AVR system as shown in the example flow. In addition, this example flow can be similarly performed when in subsequent operations (e.g., after a number of speech inputs and responses), the TV-AVR state is still the ON State or has become an ON/Unknown state. In step 1010, the VCMD determines that the directives include a TV-AVR request. For instance, this can be the case when the user utterance is "Alexa, play movie 'XYZ'."

In step 1020, the VCMD tests whether or not the AV input of the TV-AVR system is set to the proper input port, i.e., that the active AV input of the TV-AVR system is switched to the AV port that is currently connected to the VCMD. For example, if the VCMD is connected to the "HDMI_1" port of the television, the VCMD first queries TV-AVR system to identify the currently active AV input. If yes, then in step 1030, the VCMD can pause its media player in order to pause any content that is currently being sent to the TV-AVR system.

In step 1040, the VCMD then plays a TTS response on the currently active speaker of the TV-AVR system, e.g., on the TV's internal speaker. For example, in response to receiving a user utterance such as "Alexa, play movie 'XYZ'," the VCMD can play the intent message "OK, playing 'XYZ'" on the TV's internal speaker. In some embodiments, a visual indication can also be displayed on the display of the TV to indicate that the content is about to be played. In the meantime, the appropriate media player(s) of the VCMD can obtain the content from the source.

As explained herein above, in certain situations, the AV input of the TV-AVR system may not be actually active, but the VCMD may still determine otherwise because of how the TV-AVR implements the data interface specification (e.g., by maintaining the HPD and HDCP connections as active over the HDMI port for a period of time), and because the inactivity timer has not expired yet. In these situations, the user may perceive a presentation issue and, in response, provide specific speech input indicating a presentation issue (e.g., by uttering "Alexa, I can't hear"). When received by the VCMD, this specific speech causes the VCMD to initiate a directive for a corrective action, as illustrated herein above. This directive can also be initiated at a later time, such as at a time after the performance of step 1050.

In step 1050, once a connection to the content provider is obtained, the VCMD can un-pause the media player of the VCMD and then, in step 1060, send the new AV output, e.g., a stream of the movie 'XYZ', to the to the TV-AVR system to cause the content to be played on the TV-AVR system.

If, on the other hand, it is determined in step 1020 that the active input port of the TV-AVR system is not currently set to the AV port that is currently connected to the VCMD, the VCMD can send a mute command to the television. In this case, because the input port is not already set to the input port of the VCMD, it is assumed that the current content playing on the TV-AVR system, if any, is being sourced from somewhere other than the internal video player of the VCMD. In this case, the content may not be able to be paused by the VCMD, so instead, in step 1031, the VCMD can send a mute command to the TV-AVR system. The mute command can be sent via an infra-red communication channel, similar to a universal remote or can be sent via HDMI, such as a CEC command or the like. For example, the mute command can be sent from the one or more IR LEDs shown and described below in reference to FIG. 13. This can mute the speakers of the TV-AVR such that the TV audio will not interfere with any TTS/handover messages that are played by the VCMD in response to the user utterance.

In step, 1041 the VCMD can play a handover audio message on the internal speaker of the VCMD similar to that already as described above in reference to step 920 of FIG. 9.

In step 1051, the VCMD can switch the active AV port of the TV-AVR system to the VCMD, in a manner similar to that already described above in reference to step 950 of FIG. 9.

In step 1061 the VCMD can then unmute the TV-AVR system, e.g., by sending an unmute command to the TV-AVR system via the IR communication channel before initiating the new AV output stream in step 1060.

Figure 11:
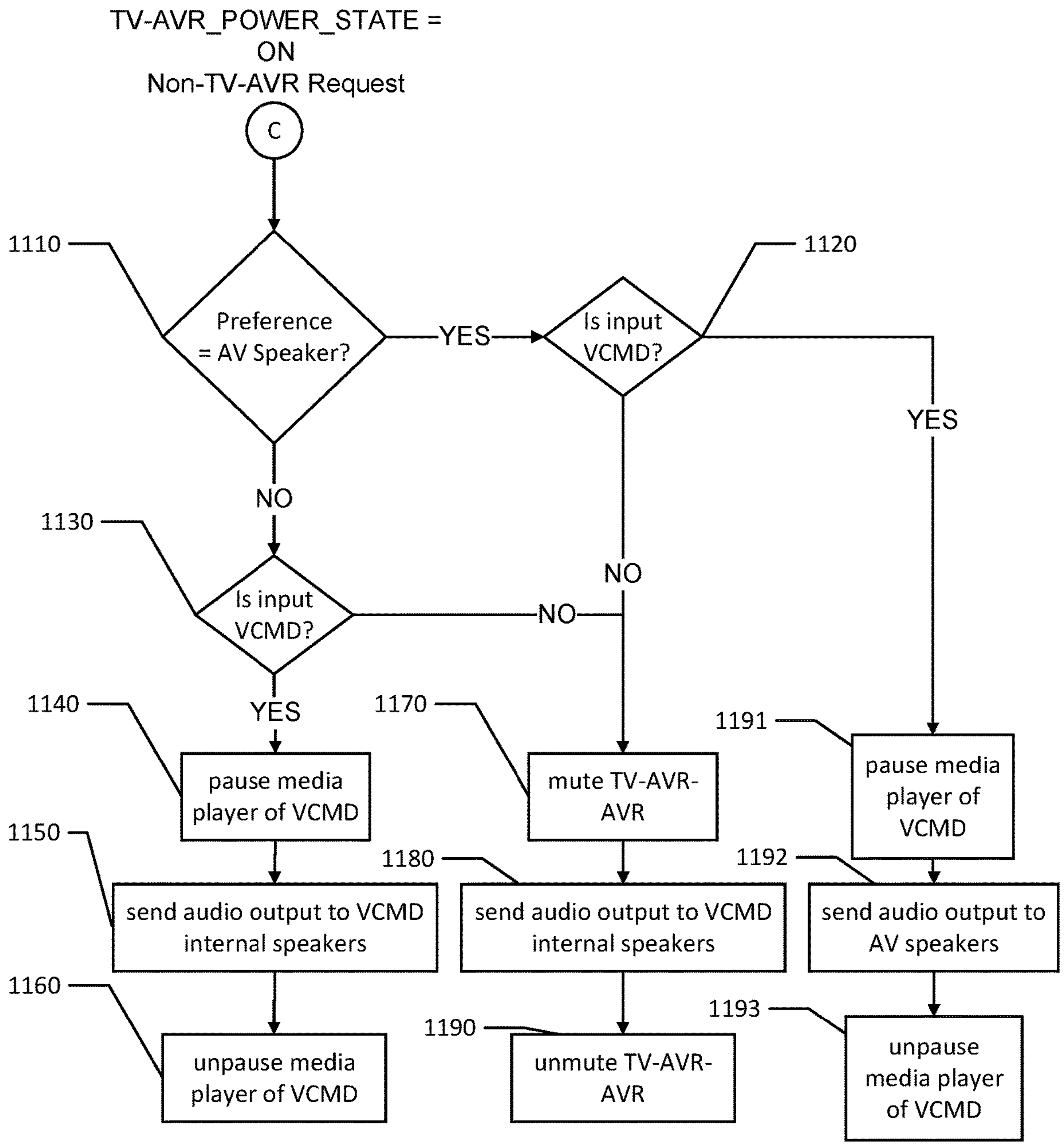
FIG. 11 shows an example flow for presenting a non-video response by a voice-controlled multimedia device when a presentation device is in a power on state in accordance with one or more embodiments of the disclosure.

FIG. 11 shows an example flow for presenting a non-video response by the VCMD when a presentation device is in a power on state in accordance with one or more embodiments of the disclosure. In particular, if the VCMD detects that the TV-AVR system is initially in the ON state, it can interact with the TV-AVR system as shown in the example flow to response to a non TV-AVR request. In addition, this example flow can be similarly performed when in subsequent operations (e.g., after a number of speech inputs and responses), the TV-AVR state is still the ON State or has become an ON/Unknown state.

In some embodiments, the VCMD can include a user preference that can affect how non-TV-AVR requests are played on the system. For example, the default setting for the VCMD can be set to play all non-TV-AVR requests on the internal speaker of the VCMD. Alternatively, the user can set the preference to treat all or some categories of non-TV-AVR requests as TV-AVR requests that are consequently played on the TV-AVR system speakers. For example, a user can set a preference to treat music utterances, such as, "Alexa, play my playlist," as TV-AVR requests because it is the default preference of the user to hear their music on the highest quality speakers possible. Additionally, in some embodiments, the user preference can be even more granular such that even for music requests, the output system can be determined based on whether or not the VCMD is in focus or not. If it is not in focus, the user preference can indicate that the audio is to be played on the internal speakers of the VCMD rather than on the speakers of the TV-AVR. FIG. 11 shows one example of the logic employed by the VCMD in the case of this more granular user preference capability.

In step 1110, the current user preference is determined. In the case where the user preference indicates that all non- TV-AVR requests should be played on the internal speakers, the system can proceed to step 1130. Alternatively if the user preference indicates that all, or some, non-TV-AVR requests should be played on the TV-AVR system speakers, then the system can proceed to step 1120.

In step 1130, the VCMD tests whether or not the AV input of the TV-AVR system is set to the proper input port, i.e., that the active AV input of the TV-AVR system is switched to the AV port that is currently connected to the VCMD. For example, if the VCMD is connected to the "HDMI_1" port of the television, the VCMD first queries the TV-AVR system to identify the currently active AV input. If yes, in step 1140, the VCMD can pause its media player in order to pause any content that is currently being sent to the TV-AVR system.

In step 1150, the VCMD then plays the requested audio content on the internal speaker of the VCMD. The audio content can include not only content that was specifically referred to in the user utterance, but can also include the appropriate TTS response.

In step 1160, once the requested audio content is finished playing, the VCMD can un-pause the media player of the VCMD and the content that was originally playing can resume.

If, on the other hand, it is determined in step 1130 that the active input port of the TV-AVR system is not currently set to the AV port that is currently connected to the VCMD, in step 1170, the VCMD can send a mute command to the television. In this case, because the input port is not already set to the input port of the VCMD it is assumed that the current content playing on the TV-AVR system, if any, is being sourced from somewhere other than the internal video player of the VCMD. In this case, the content may not be able to be paused by the VCMD, so instead, the VCMD can send a mute command to the TV-AVR system using an infra-red communication channel, similar to a universal remote. For example, the mute command can be sent from the one or more IR LEDs shown and described below in reference to FIG. 13. This can mute the speakers of the TV-AVR as described above in reference to FIG. 10.

In step 1180, the VCMD then plays the requested audio content on the internal speaker of the VCMD. The audio content can include not only content that was specifically referred to in the user utterance, but can also include an appropriate TTS response.

In step 1190 the VCMD can then unmute the TV-AVR system, e.g., by sending another unmute command via the IR communication channel.

Returning to step 1120, the VCMD tests whether or not the AV input of the TV-AVR system is set to the proper input port as in step 1130 described above. If yes, in step 1191, the VCMD can pause its media player in order to pause any content that is currently being sent to the TV-AVR system.

In step 1192, the VCMD then plays the requested audio content on the speakers of the TV-AVR system. The audio content can include not only content that was specifically referred to in the user utterance, but can also include an appropriate TTS response.

As explained herein above, in certain situations, the AV input of the TV-AVR system may not be actually active, but the VCMD may still determine otherwise because of how the TV-AVR implements the data interface specification (e.g., by maintaining the HPD and HDCP connections as active over the HDMI port for a period of time), and because the inactivity timer has not expired yet. In these situations, the user may perceive a presentation issue and, in response, provide specific speech input indicating a presentation issue (e.g., by uttering "Alexa, I can't hear"). When received by the VCMD, this specific speech causes the VCMD to initiate a directive for a corrective action, as illustrated herein above. This directive can also be initiated at a later time, such as at a time after the performance of step 1193.

In step 1193, if the directive for the corrective was not initiated, once the requested audio content is finished playing, the VCMD can un-pause the media player of the VCMD and the content that was originally playing can resume.

FIG. 12 schematically depicts a voice-controlled multimedia device in various views in accordance with one or more embodiments of the present disclosure. As illustrated in perspective view 1210, the VCMD 1200 may have a box-like housing 1202. Specifically, the housing 1202 may have a number of sidewalls that form sides of the device, as well as walls forming top and bottom surfaces. The VCMD 1200 may include a set of infrared LEDs that are configured to emit infrared light through each of the sidewalls, and m some embodiments, through the top and bottom surfaces, of the housing 1202. Other embodiments may have different form factors. In some embodiments, the VCMD 1200 may be treated with a water resistant coating.

The VCMD 1200 may include one or more physical controls, such as buttons, switches, and other control devices. For example, the VCMD 1200 may include volume control buttons 1212 that control a speaker volume of the VCMD 1200 or of a connected device. The VCMD 1200 may include an action button 1214, a mute button or a privacy button 1216, and other buttons. In some embodiments, the VCMD 1200 may include a display or other component.

The VCMD 1200 may include one or more microphone holes 1218 that can be used to facilitate detection of ambient sound by one or more microphones positioned within the housing 1202.

The VCMD 1200 may include a light bar component 1220. The light bar component 1220 may be include an optically clear or colored elongated component 1222 through which light from one or more LEDs may be visible. The light bar component 1220 may be positioned at a front side 1230 of the VCMD 1200. In some embodiments, such as the illustrated embodiment, the light bar component 1220 may be linear or straight and may be positioned along an edge 1232 of the housing 1202. The elongated component 1222 may therefore be attached to, or integrated into, the housing 1202 and may form an edge of the housing 1202. The light bar component 1220 may be configured to indicate a location of sound detected by the VCMD 1200. For example, if a microphone of the VCMD 1200 detects sound or voice coming from a left side of the VCMD 1200, one or more LEDs on the left side of the VCMD 1200 may be caused to illuminate, so as to indicate to a user that sound is being detected from the left side of the VCMD 1200. The light bar component 1220 may dynamically modify LEDs that are illuminated while sound or voice is detected, and may also be used to visually communicate information to a user. For example, during processing, the light bar component 1220 may have a certain illumination status, while the device is muted, the light bar component 1220 may have a different illumination status, and so forth. The light bar component 1220 may be a straight or linear light bar component and may be visible to users. In some embodiments, the light bar component 1220 may be positioned elsewhere, along different edges or surfaces, and can be positioned diagonally or in another orientation respective to the housing of the device.

A rear side 1240 of the VCMD 1200 is illustrated in FIG. 12. The rear side 1240 of the VCMD 1200 may include one or more ports, inputs, outputs, and the like. For example, the rear side 1240 may include an Ethernet port, USB, or micro USB input 1242, a power input jack 1244, an HDMI port 1246 configured to output high definition video and audio, a 1248, an external infrared light blaster connection port 1248 (e.g., infrared light sensor input or output jack, etc.), and the like. In some embodiments, the VCMD 1200 may include a rechargeable battery.

A bottom surface 1250 of the VCMD 1200 may be formed by a bottom wall 1252 and may include components such as rubber feet, nonslip material, and other components to support the device. The bottom wall 1252 may include speaker holes 1254 to facilitate sound output from one or more speakers of the VCMD 1200.

FIG. 13 shows another view of the VCMD according to certain embodiments. An internal component assembly 1340, including the light bar component, may be positioned inside the housing 1300. A first infrared LED 1350 and a second infrared LED 1360 may be configured to emit infrared light through the walls of the housing 1300. Accordingly, light emitted by the side-firing LEDs may be visible through the clear elongated component 1310.

The microphone circuit board 1341 may include one or more microphones. For example, eight microphones may be positioned on a second surface of the microphone circuit board 1341. A first microphone 1370 may be angled in a first direction. A second microphone 1372 may be angled in a second direction. A third microphone 1374 may be angled in the first direction, and a fourth microphone 1376 may be angled in the second direction. A fifth microphone 1378, a sixth microphone 1380, a seventh microphone 1382, and an eighth microphone 1384 may be angled in a third direction. The set of microphones may be arranged in an array or in a different arrangement. The set of microphones may be used to detect sound and generate an audio signal, and also to detect a location of sound that is captured by any of the microphones.

Some or all of the process described herein above (or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 14 is a schematic block diagram of a VCMD in accordance with one or more example embodiments of the disclosure. The VCMD 1400 may include any suitable computing device including, but not limited to, a server system, a mobile device such as a smartphone, a tablet, an e-reader, a wearable device, or the like; a desktop computer; a laptop computer; a content streaming device; a set-top box; a scanning device; a barcode scanning wand; or the like.

The VCMD 1400 may be configured to communicate with one or more servers, user devices, or the like. The VCMD 1400 may be configured to determine voice commands, determine wakeword utterances, determine and/or control other devices, and other operations. The VCMD 1400 may be configured to emit light, detect sound, output digital content, and other functionality. In some embodiments, a single remote server or a single group of remote servers may be configured to perform more than one type of functionality in conjunction with a barcode scanning device.

The VCMD 1400 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fibercoaxial (HFC) medium, a microwave medium, a radio frequency communication medium, a satellite communication medium, or any combination thereof.

In an illustrative configuration, the VCMD 1400 may include one or more, one or more memory devices 1404 (also referred to herein as memory 1404), one or more input/output (I/O) interface(s) 1406, one or more network interface(s) 1408, one or more sensor(s) or sensor interface(s) 1410, one or more transceiver(s) 1412, one or more optional camera(s) 1414, one or more optional microphone(s) 1416, and data storage 1420. The VCMD 1400 may further include one or more bus(es) 1418 that functionally couple various components of the VCMD 1400. The VCMD 1400 may further include one or more antenna(e) 1434 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1418 may include at least one of a system bus, a memory bus, an address bus, or a message bus, and may permit the exchange of information (e.g., data (including computer-executable code), signaling, etc.) between various components of the VCMD 1400. The bus(es) 1418 may include, without limitation, a memory bus or a memory controller, a peripheral bus, an accelerated graphics port, and so forth. The bus(es) 1418 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1404 of the VCMD 1400 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1420 may include removable storage and/or non-removable storage including, but not limited to, magnetic storage, optical disk storage, and/or tape storage. The data storage 1420 may provide non-volatile storage of computer-executable instructions and other data. The memory 1404 and the data storage 1420, removable and/or non-removable, are examples of computer-readable storage media (CRSM) as that term is used herein.

The data storage 1420 may store computer-executable code, instructions, or the like that may be loadable into the memory 1404 and executable by the processor(s) 1402 to cause the processor(s) 1402 to perform or initiate various operations. The data storage 1420 may additionally store data that may be copied to the memory 1404 for use by the processor(s) 1402 during the execution of the computer-executable instructions. Moreover, output data generated as a result of execution of the computer-executable instructions by the processor(s) 1402 may be stored initially in the memory 1404, and may ultimately be copied to the data storage 1420 for non-volatile storage.

More specifically, the data storage 1420 may store one or more operating systems (O/S) 1422; one or more database management systems (DBMS) 1424; and one or more program module(s), applications, engines, computer-executable code, scripts, or the like such as, for example, one or more sound detection module(s) 1426, one or more communication module(s) 1428, one or more light bar control module(s) 1430, and/or one or more remote control module(s) 1432. Some or all of these module(s) may be sub-module(s). Any of the components depicted as being stored in the data storage 1420 may include any combination of software, firmware, and/or hardware. The software and/or firmware may include computer executable code, instructions, or the like that may be loaded into the memory 1404 for execution by one or more of the processor(s) 1402. Any of the components depicted as being stored in the data storage 1420 may support functionality described in reference to corresponding components named earlier in this disclosure.

The data storage 1420 may further store various types of data utilized by the components of the VCMD 1400. Any data stored in the data storage 1420 may be loaded into the memory 1404 for use by the processor(s) 1402 in executing computer-executable code. In addition, any data depicted as being stored in the data storage 1420 may potentially be stored in one or more datastore(s) and may be accessed via the DBMS 1424 and loaded in the memory 1404 for use by the processor(s) 1402 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 14, an example datastore(s) may include, for example, historical data for previously identified products, purchase or order history, user profile information, and/or other information.

The processor(s) 1402 may be configured to access the memory 1404 and execute the computer-executable instructions loaded therein. For example, the processor(s) 1402 may be configured to execute the computer-executable instructions of the various program module(s), applications, engines, or the like of the VCMD 1400 to cause or facilitate various operations to be performed in accordance with one or more embodiments of the disclosure. The processor(s) 1402 may include any suitable processing unit capable of accepting data as input, processing the input data in accordance with stored computer-executable instructions, and generating output data. The processor(s) 1402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1402 may be capable of supporting any of a variety of instruction sets.

Referring now to functionality supported by the various program module(s) depicted in FIG. 14, the sound detection module(s) 1426 may include computer-executable instructions, code, or the like that responsive to execution by one or more of the processor(s) 1402 may perform functions including, but not limited to, detect sound, determine sound meanings, generate audio signals and audio data, determine a location of sound, and the like.

The communication module(s) 1428 may include computer-executable instructions, code, or the like that responsive to execution by one or more of the processor(s) 1402 may perform functions including, but not limited to, sending and/or receiving data, including content, sending and/or receiving instructions and commands, and the like. The light bar control module(s) 1430 may include computer-executable instructions, code, or the like that responsive to execution by one or more of the processor(s) 1402 may perform functions including, but not limited to, determining a light bar illumination status, determining which LEDs to illuminate, causing a change in illumination status, and the like.

The remote control module(s) 1432 may include computer-executable instructions, code, or the like that responsive to execution by one or more of the processor(s) 1402 may perform functions including, but not limited to, controlling other electronic devices, sending infrared signals, sending or outputting digital audio or video signals, and the like.

Referring now to other illustrative components depicted as being stored in the data storage 1420, the O/S 1422 may be loaded from the data storage 1420 into the memory 1404 and may provide an interface between other application software executing on the VCMD 1400 and the hardware resources of the VCMD 1400. More specifically, the O/S 1422 may include a set of computer-executable instructions for managing the hardware resources of the VCMD 1400 and for providing common services to other application programs (e.g., managing memory allocation among various application programs). In certain example embodiments, the O/S 1422 may control execution of the other program module(s). The O/S 1422 may include any operating system now known or which may be developed in the future including, but not limited to, any server operating system, any mainframe operating system, or any other proprietary or non-proprietary operating system.

The DBMS 1424 may be loaded into the memory 1404 and may support functionality for accessing, retrieving, storing, and/or manipulating data stored in the memory 1404 and/or data stored in the data storage 1420. The DBMS 1424 may use any of a variety of database models (e.g., relational model, object model, etc.) and may support any of a variety of query languages. The DBMS 1424 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the VCMD 1400 is a mobile device, the DBMS 1424 may be any suitable lightweight DBMS optimized for performance on a mobile device.

Referring now to other illustrative components of the VCMD 1400, the input/output (I/O) interface(s) 1406 may facilitate the receipt of input information by the VCMD 1400 from one or more I/O devices as well as the output of information from the VCMD 1400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the VCMD 1400 or may be separate. The I/O devices may further include, for example, any number of peripheral devices such as data storage devices, printing devices, and so forth.

The I/O interface(s) 1406 may also include an interface for an external peripheral device connection such as universal serial bus (USB), FireWire, Thunderbolt, Ethernet port or other connection protocol that may connect to one or more networks. The I/O interface(s) 1406 may also include a connection to one or more of the antenna(e) 1434 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The VCMD 1400 may further include one or more network interface(s) 1408 via which the VCMD 1400 may communicate with any of a variety of other systems, platforms, networks, devices, and so forth. The network interface(s) 1408 may enable communication, for example, with one or more wireless routers, one or more host servers, one or more web servers, and the like via one or more networks.

The antenna(e) 1434 may include any suitable type of antenna depending, for example, on the communications protocols used to transmit or receive signals via the antenna(e) 1434. Non-limiting examples of suitable antennae may include directional antennae, non-directional antennae, dipole antennae, folded dipole antennae, patch antennae, multiple-input multiple-output (MIMO) antennae, or the like. The antenna(e) 1434 may be communicatively coupled to one or more transceiver(s) 1412 or radio components to which or from which signals may be transmitted or received.

As previously described, the antenna(e) 1434 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1434 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1434 may be configured to transmit or receive radio frequency signals within any suitable frequency range forming part of the unlicensed portion of the radio spectrum.

The antenna(e) 1434 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1412 may include any suitable radio component(s) for—in cooperation with the antenna(e) 1434—transmitting or receiving radio frequency (RF) signals in the bandwidth and/or channels corresponding to the communications protocols utilized by the VCMD 1400 to communicate with other devices. The transceiver(s) 1412 may include hardware, software, and/or firmware for modulating, transmitting, or receiving—potentially in cooperation with any of antenna(e) 1434—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1412 may further include hardware, firmware, or software for receiving GNSS signals. The transceiver(s) 1412 may include any known receiver and baseband suitable for communicating via the communications protocols utilized by the VCMD 1400. The transceiver(s) 1412 may further include a low noise amplifier (LNA), additional signal amplifiers, an analog-to-digital (AID) converter, one or more buffers, a digital baseband, or the like.

The sensor(s)/sensor interface(s) 1410 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The camera(s) 1414 may be any device configured to capture ambient light or images. The microphone(s) 1416 may be any device configured to receive analog sound input or voice data.

It should be appreciated that the program module(s), applications, computer-executable instructions, code, or the like depicted in FIG. 14 as being stored in the data storage 1420 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the VCMD 1400, and/or hosted on other computing device(s) accessible via one or more networks, may be provided to support functionality provided by the program module(s), applications, or computer-executable code depicted in FIG. 14 and/or additional or alternate functionality. Further, functionality may be modularized differently such that processing described as being supported collectively by the collection of program module(s) depicted in FIG. 14 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 14 may be implemented, at least partially, in hardware and/or firmware across any number of devices.

It should further be appreciated that the VCMD 1400 may include alternate and/or additional hardware, software, or firmware components beyond those described or depicted without departing from the scope of the disclosure. More particularly, it should be appreciated that software, firmware, or hardware components depicted as forming part of the VCMD 1400 are merely illustrative and that some components may not be present or additional components may be provided in various embodiments. While various illustrative program module(s) have been depicted and described as software module(s) stored in the data storage 1420, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as submodule(s) of other module(s).

One or more operations of the methods, process flows, and use cases described herein above may be performed by a device having the illustrative configuration depicted in FIG. 14, or more specifically, by one or more engines, program module(s), applications, or the like executable on such a device. It should be appreciated, however, that such operations may be implemented in connection with numerous other device configurations.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

receiving, at a microphone of a voice-controlled device having an internal speaker and being in an audio mode, first speech input, the voice-controlled device being operatively connected to a first high-definition multimedia interface (HDMI) port of a television, the first speech input requesting at least video content;

determining, by the voice-controlled device, that a video response should be played at the television based at least in part on the first speech input;

playing, by the voice-controlled device in the audio mode, an audio message over the internal speaker, the audio message indicating that the video response will be played at the television;

switching, by the voice-controlled device, to an audio video (AV) mode from the audio mode, the switching to the AV mode comprising sending a control signal to the television, the control signal associated with changing an active input port of the television to the HDMI port; and sending, by the voice-controlled device in the AV mode, the video response to the television over the HDMI port.

2. The computer-implemented method of claim 1, further comprising:

receiving, at the microphone of the voice-controlled device, second speech input while the voice-controlled device is in the AV mode, the second speech input indicating an issue with a presentation of the video response;

switching, by the voice-controlled device, to the audio mode based at least in part on the second speech input;

resetting, by the voice-controlled device, a volume level of the internal speaker in the audio mode; and playing, by the voice-controller device in the audio mode, an audio response over the internal speaker according to the volume level.

3. The computer-implemented method of claim 2, further comprising:

receiving, at the microphone of the voice-controlled device, third speech input;

determining, by the voice-controlled device, that audio only should be played based at least in part on the third speech input; and playing, by the voice-controlled device in the audio mode, a second audio response over the internal speaker in response to the third speech input.

4. A voice-controlled device, comprising:

a data interface configured to operatively couple the voice-controlled device with a presentation device;

a microphone;

an internal presentation interface;

a processor; and a memory storing computer-readable instructions that, upon execution by the processor, configure the voice-controlled device to:

receive, at the microphone, first speech input while the voice-controlled device is in a first mode, the first mode associated with presenting speech input responses at the internal presentation interface;

determine that a first response to the first speech input should be presented at the presentation device;

present a first message over the internal presentation interface, the first message indicating that the first response will be presented at the presentation device;

switch, by the voice-controlled device, to a second mode from the first mode, the second mode associated with presenting the first response at the presentation device; and send, by the voice-controlled device in the second mode, the first response to the presentation device over the data interface.

5. The voice-controlled device of claim 4, wherein the data interface comprises an HDMI interface, wherein the internal presentation interface comprises an internal speaker, wherein the presentation device comprises a television, and wherein the computer-readable instructions further configure the voice-controlled device to:

send a control signal to the television, the control signal associated with changing an active input port of the television to an HDMI port of the television.

6. The voice-controlled device of claim 5, wherein the computer-readable instructions further configure the voice-controlled device to:

receive, at the microphone, second speech input while the voice-controlled device is in the second mode, the second speech input indicating an issue with a presentation of the first response;

switch to the first mode based at least in part on the second speech input; and present, at the internal presentation interface, a second response to the second speech input.

7. The voice-controlled device of claim 5, wherein the computer-readable instructions further configure the voice-controlled device to:

receive, while the voice-controlled device is in the second mode, second speech input;

determine that a second response to the second speech input should be presented at the presentation device;

determine that an activity state associated with the data interface is inactive;

send another control signal to the presentation device, the other control signal associated with changing the activity state to active; and send the second response to the presentation device.

8. The voice-controlled device of claim 4, wherein the computer-readable instructions further configure the voice-controlled device to:

receive, while the voice-controlled device is in the second mode, second speech input;

determine that a second response to the second speech input should be presented at the presentation device;

determine that an activity state associated with the data interface is active;

cause a data stream to the presentation device to be paused; and send the second response to the presentation device, wherein the second response is presented while the data stream is paused.

9. The voice-controlled device of claim 4, wherein the computer-readable instructions further configure the voice-controlled device to:

receive, while the voice-controlled device is in the second mode, second speech input;

determine that a second response to the second speech input should be presented at the presentation device;

determine that an activity state associated with the data interface is active;

determine that a power state associated with the presentation device is unknown; and send the second response to the presentation device.

10. The voice-controlled device of claim 4, wherein the computer-readable instructions further configure the voice-controlled device to:

receive, while the voice-controlled device is in the second mode, second speech input;

determine that a second response to the second speech input should be presented at the presentation device;

determine that an activity state associated with the data interface is inactive;

determine that a power state associated with the presentation device is unknown;

send one or more control signals to the presentation device, the one or more control signals associated with changing the activity state to active and the power state to ON; and send the second response to the presentation device.

11. The voice-controlled device of claim 4, wherein the first mode is an audio mode and the second mode is an audio and video (AV) mode, wherein the computer-readable instructions further configure the voice-controlled device to:

receive, while the voice-controlled device is in the AV mode, second speech input;

determine that an audio response to the second speech input is to be presented;

determine that an activity state associated with the data interface is inactive; and present, while the voice-controlled device is in the AV mode the audio response at the internal presentation interface.

12. The voice-controlled device of claim 4, wherein the first mode is an audio mode and the second mode is an audio and video (AV) mode, wherein the computer-readable instructions further configure the voice-controlled device to:

receive, while the voice-controlled device is in the AV mode, second speech input;

determine that an audio response to the second speech input is to be presented;

determine that a power state of the presentation device is unknown;

determine that an activity state associated with the data interface is active; and send the audio response to the presentation device.

13. The voice-controlled device of claim 4, wherein the computer-readable instructions further configure the voice-controlled device to:

determine an activity state associated with the data interface, wherein the data interface comprises an HDMI interface, wherein the activity state indicates that the HDMI interface is inactive, and set the activity state to active based at least in part on an active hot plug detect (HPD) connection and an active high-bandwidth digital content protection (HDCP) connection associated with an HDMI port of the presentation device.

14. The voice-controlled device of claim 4, wherein the first mode is an audio mode and the second mode is an audio and video (AV) mode, wherein the computer-readable instructions further configure the voice-controlled device to:

receive, while the voice-controlled device is in the AV mode, second speech input;

determine that an audio response to the second speech input is to be presented;

determine that an activity state associated with the data interface is active;

cause a data stream to the presentation device to be paused; and send the audio response to the presentation device wherein the audio response is presented while the data stream is paused.

15. A non-transitory computer-readable storage medium comprising instructions that, upon execution on a voice-controlled device, cause the voice-controlled device to perform operations comprising:

receiving, at a microphone of the voice-controlled device, first speech input while the voice-controlled device is in a first mode, the first mode associated with presenting speech input responses at an internal presentation interface of the voice-controlled device;

determining that a first response to the first speech input should be presented at a presentation device, the voice-controlled device communicatively coupled with the presentation device over a data interface;

presenting a first message over the internal presentation interface, the first message indicating that the first response will be presented at the presentation device;

switching, by the voice-controlled device, to a second mode from the first mode, the second mode associated with presenting the first response at the presentation device; and sending, by the voice-controlled device in the second mode, the first response to the presentation device over the data interface.

16. The non-transitory computer-readable storage medium of claim 15 further comprising additional instructions that, upon execution on the voice-controlled device, cause the voice-controlled device to perform additional operations comprising:

receiving, while the voice-controlled device is in the first mode, second speech input;

determining that a second response to the second speech input is to be presented at the internal presentation interface; and presenting the second response at the internal presentation interface while remaining in the first mode.

17. The non-transitory computer-readable storage medium of claim 15 further comprising additional instructions that, upon execution on the voice-controlled device, cause the voice-controlled device to perform additional operations comprising:

receiving, while the voice-controlled device is in the first mode, second speech input;

determining at least one of a power state or an activity state of the presentation device;

determining that an audio response to the second speech input is to be presented; and presenting the audio response at the internal presentation interface while remaining in the first mode and without controlling the power state of the activity state of the presentation device.

18. The non-transitory computer-readable storage medium of claim 15 further comprising additional instructions that, upon execution on the voice-controlled device, cause the voice-controlled device to perform additional operations comprising:

determining at least one of a power state or an activity state of the presentation device; and sending, to the presentation device, one or more control signals based at least in part on the power state or the activity state, the one or more control signals associated with a presentation of the first response at the presentation device.

19. The non-transitory computer-readable storage medium of claim 18, wherein the one or more control signals comprise a signal to turn on power to the presentation device, wherein the signal is based at least in part on the power state indicating that the presentation device is powered off.

20. The non-transitory computer-readable storage medium of claim 18, wherein the one or more control signals comprise a signal to set an active data interface of the presentation device to a data port operatively connected to the data interface of the voice-controlled device, wherein the signal is based at least in part on the activity state indicating that the active data interface of the presentation device is set to a different data port.

* * * * *